United States Patent
Naudé

(10) Patent No.: US 10,704,649 B2
(45) Date of Patent: Jul. 7, 2020

(54) CONTINUOUSLY VARIABLE TRANSMISSION WITH RADIAL DRIVE

(71) Applicant: VARIBOX IP (PTY) LIMITED, Randburg (ZA)

(72) Inventor: Johannes Jacobus Naudé, Randburg (ZA)

(73) Assignee: VARIBOX IP (PTY) LIMITED, Randburg (ZA)

( * ) Notice: Subject to any disclaimer, the term of this patent is extended or adjusted under 35 U.S.C. 154(b) by 48 days.

(21) Appl. No.: 15/999,835

(22) PCT Filed: May 26, 2016

(86) PCT No.: PCT/ZA2016/050017
§ 371 (c)(1),
(2) Date: Aug. 20, 2018

(87) PCT Pub. No.: WO2017/143363
PCT Pub. Date: Aug. 24, 2017

(65) Prior Publication Data
US 2019/0360556 A1    Nov. 28, 2019

(30) Foreign Application Priority Data

Feb. 18, 2016 (ZA) .................. 2016/01106
Feb. 23, 2016 (ZA) .................. 2016/01211
Feb. 29, 2016 (ZA) .................. 2016/01369

(51) Int. Cl.
*F16H 1/06* (2006.01)
*F16H 15/12* (2006.01)
*F16H 37/08* (2006.01)

(52) U.S. Cl.
CPC ............ *F16H 1/06* (2013.01); *F16H 15/12* (2013.01); *F16H 37/0853* (2013.01); *F16H 2037/088* (2013.01)

(58) Field of Classification Search
CPC . F16H 15/12; F16H 37/0853; F16H 2037/088
(Continued)

(56) References Cited

U.S. PATENT DOCUMENTS 1,329,867 A * 2/1920 Wenderhold ............ F16H 15/12
476/12
1,913,118 A * 6/1933 Jacobsen ................. F16H 15/08
476/48
(Continued)

FOREIGN PATENT DOCUMENTS

DE       3217592      11/1983
FR       630550 A  * 12/1927 ............. F16H 15/12
(Continued)

OTHER PUBLICATIONS

International Search Report for PCT/ZA2016/050017 dated Jan. 19, 2017, 2 pages.
(Continued)

*Primary Examiner* — Roger L Pang
(74) *Attorney, Agent, or Firm* — Nixon & Vanderhye P.C.

(57) ABSTRACT

A continuously variable transmission in which a circular driver, positioned between and frictionally engaged with opposing surfaces of two oppositely rotatable disks, which are urged towards each other with a biasing mechanism, is mounted to, and is movable axially along, a drive shaft which extends radially from an input shaft which rotates the drive shaft about a longitudinal axis of the input shaft, and wherein output drive is taken from the disks via a speed balancing system.

11 Claims, 22 Drawing Sheets

(58) Field of Classification Search
USPC ........ 476/50, 51, 54, 56, 57, 65, 69; 74/416, 74/721; 475/200, 214, 217
See application file for complete search history.

(56) References Cited

U.S. PATENT DOCUMENTS

| | | | |
|---|---|---|---|
| 4,137,785 A | 2/1979 | Virlon | |
| 4,819,494 A | 4/1989 | Giuliani et al. | |
| 5,795,259 A | 8/1998 | Stoliker | |
| 2013/0172139 A1 | 7/2013 | Todd et al. | |
| 2015/0198224 A1* | 7/2015 | Wu | F16H 15/12 476/33 |
| 2018/0023673 A1* | 1/2018 | Baxendale | F16H 37/022 475/214 |

FOREIGN PATENT DOCUMENTS

| | | |
|---|---|---|
| FR | 880277 | 3/1943 |
| GB | 2231926 | 11/1990 |

OTHER PUBLICATIONS

Written Opinion of the ISA for PCT/ZA2016/050017 dated Jan. 19, 2017, 3 pages.

* cited by examiner

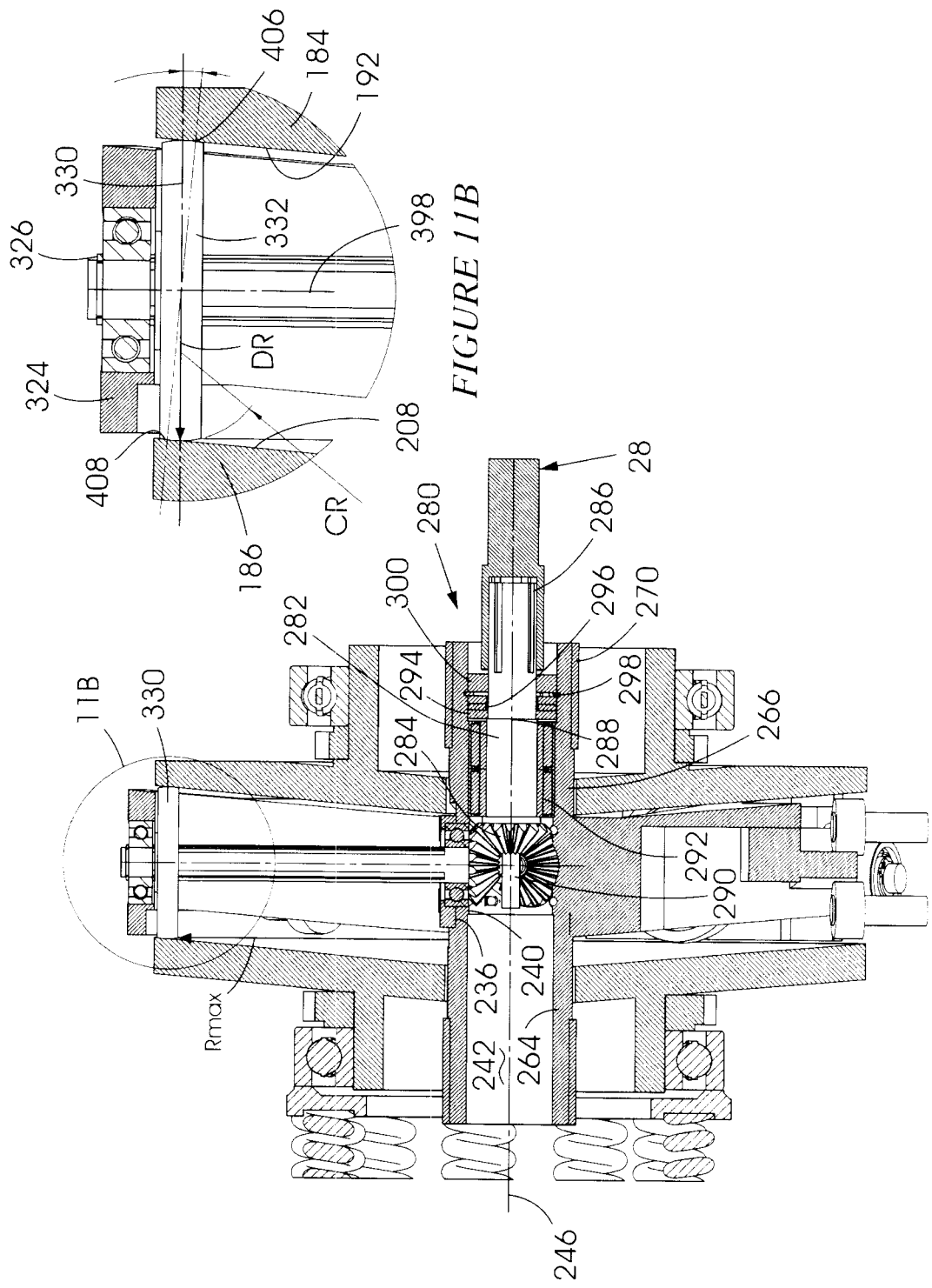

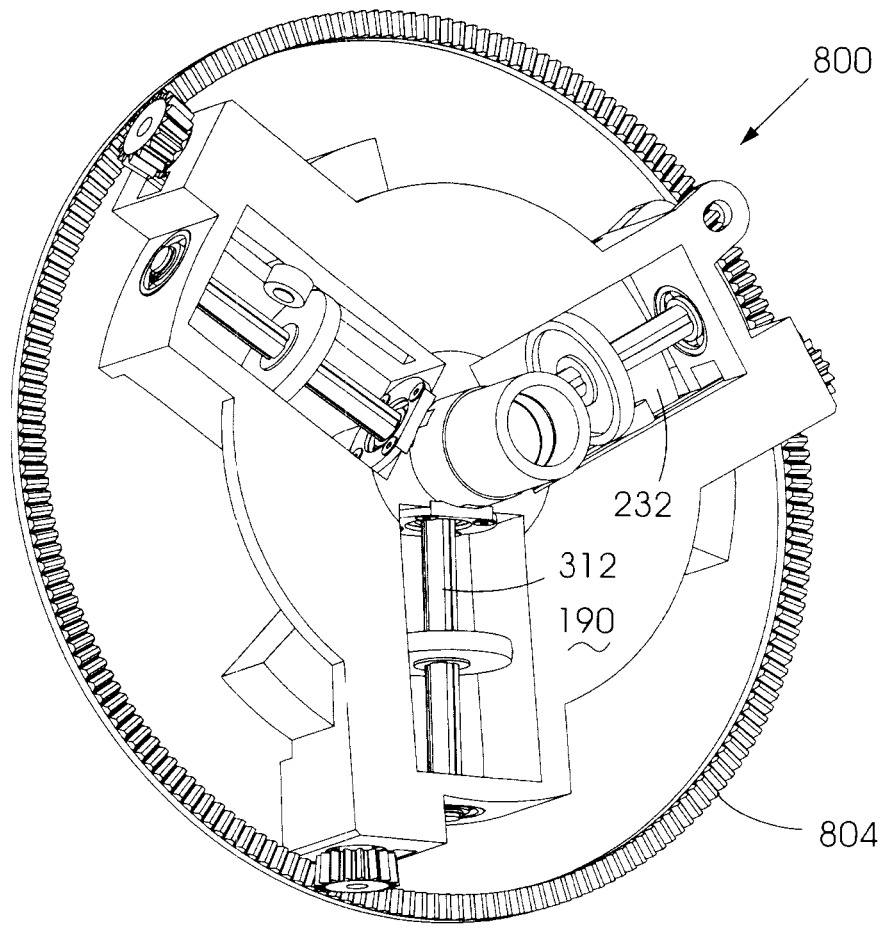
FIGURE 19A
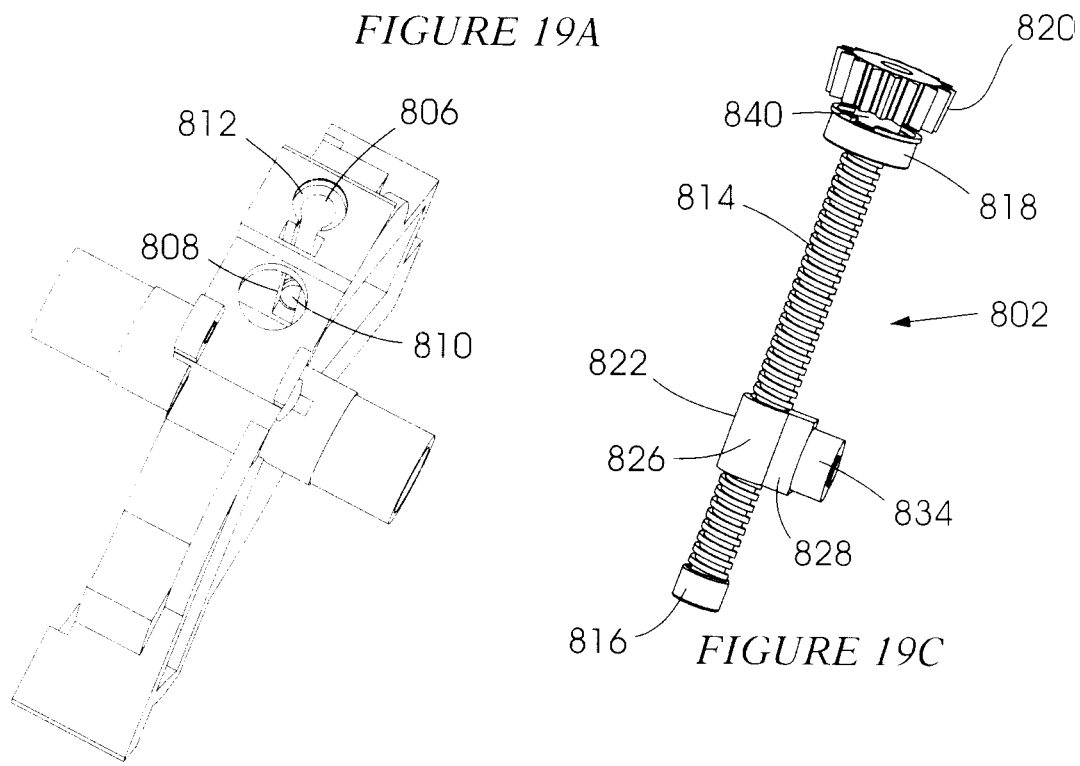
FIGURE 19B
FIGURE 19C

CONTINUOUSLY VARIABLE TRANSMISSION WITH RADIAL DRIVE

This application is the U.S. national phase of International Application No. PCT/ZA2016/050017 filed May 26, 2016 which designated the U.S. and claims priority to ZA Patent Application No. 2016/01106 filed Feb. 18, 2016, ZA Patent Application No. 2016/01211 filed Feb. 23, 2016 and ZA Patent Application No. 2016/01369 filed Feb. 29, 2016, the entire contents of each of which are hereby incorporated by reference.

BACKGROUND OF THE INVENTION

This invention relates to a continuously variable transmission which can be used in an automotive or other application.

A traction fluid allows a friction drive to be transferred between two steel interfaces e.g. in a pulley and belt transmission or in a toroidal transmission. However torque transmission capability and mechanical efficiency are adversely affected by the following:

(1) in a pulley and belt transmission, power is transmitted from a first pulley via a friction drive to a belt and then from the belt through another friction drive to a second pulley. In a toroidal transmission, power is transmitted from a first toroid to a roller and then from the roller to a second toroid. Thus, in each case, there are two friction interfaces in series, a configuration which compounds mechanical losses. For example if the efficiency of each interface is 90% then the efficiency of two interfaces in series is 81%;

(2) an input friction radius, and an output friction radius, of a friction interface vary as a drive ratio varies. For a given input torque, as the drive ratio changes, this variation requires a variable clamping force which is typically effected by means of a hydraulic control system which includes a hydraulic pump the use of which decreases mechanical efficiency;

(3) the variation in the input radius, and in the output radius, limit the torque output, particularly when the input friction radius is at a minimum. This means that the transmission cannot handle a maximum value of input torque through its ratio range, and use must be made of a torque-limiting mechanism which, typically, is electronically controlled to limit engine power and torque in the relevant ratios; and (4) when an output speed is slightly above zero more torque may be called for than what the friction drive can supply. If the friction drive forms a part of a transmission which is installed in a vehicle it may not be possible for the vehicle to move from a rest position over a kerb or a similar small obstacle.

GB (1913) 14696 describes a frictional transmission which includes a driver wheel peripherally engaged with planar surfaces of opposed disks. The arrangement is one in which substantial forces are generated, due to an asymmetrical distribution.

GB(1912) 29132 describes a frictional drive arrangement in which a drive mechanism engages peripherally with two wheels and imparts counter-rotating drive to two disks. An adjustable output drive is provided by wheels which are axially movable along shafts which are rotated by the disks. The construction is not compact for a substantial volume exists between the disks. Also, the drive mechanism is loaded by the disks in one direction and requires components of a substantial strength to cater for these unidirectional loads.

An object of the present invention is to provide a continuously variable transmission (CVT) with a radial drive, of compact form, which has a balanced construction which helps to resist loading effects.

SUMMARY OF THE INVENTION

The invention provides a CVT variator which includes a first disk which is rotatable about a first axis in a first direction and which has a first disk face, a second disk, spaced from the first disk, which is rotatable about the first axis in a second direction which is opposite to the first direction and which has a second disk face opposing the first face, a drive device which includes a driver with a circular rim and with a central axis, wherein the driver is mounted at a radial distance from the first axis between the first disk face and the second disk face for rotation about the central axis at a first rotational speed, a clamping mechanism for urging the disks towards each other so that the circular rim of the driver is frictionally engaged at a first contact location with the first disk face and at a second contact location with a second disk face whereby, upon rotation of the driver at the first rotational speed, the first disk and the second disk are respectively rotated and produce respective first and second rotational output drives, an actuator for varying said radial distance, and a coupling system which couples together the first and second output drives to produce a combined output drive at a second rotational speed.

The coupling system may include a planetary speed balancing system to compensate for rotational speed differences in the first and second rotational output drives.

The drive device may include a shaft to which the driver is mounted and wherein the drive is movable along at least a part of a length of the shaft in order to vary said radial distance.

The central axis may be at an angle other than 90° to the first axis.

In one embodiment a surface of the first disk face at the first contact location is not parallel to the central axis and a surface of the second disk face at the second contact location is not parallel to the central axis.

It is possible for the first disk face, and for the second disk face, to be planar. However in a preferred embodiment the first disk face is convex and the second disk face is concave.

The variator may include a plurality of said drive devices which, at least for balancing loads during operation, are preferably equally angularly spaced apart from one another circumferentially around the first axis.

Each central location may, according to design, essentially comprise a contact point i.e. be of minimal dimensions. It is preferred though for the design to be such that each contact location gives rise to a line contact i.e. an arrangement in which loading stresses, and hence wear, are reduced.

To cater for a low torque output when the variator is in a low ratio and at a low speed, the variator may be provided in combination with a gear mechanism which transmits power along a power path between an input and output and wherein the gear mechanism includes a sprag in the power path, the input to the power path constituting, as well, an input to the drive device and the output from the power path constituting, as well, an output for the combined output drive, whereby the power path is in parallel to a power flow path through the variator, and wherein the sprag is operative to transfer power along the power path from the input to the output when the ratio of the first rotational speed and the sprag is inoperative so as not to transfer power from the input to the output when the variator is at a ratio other than said minimum ratio.

In one form of the invention a circular rim of the driver has a first surface which is at an angle less than 90° to the central axis and which is in contact with the first disk face at the first contact location, and a second surface which is at an angle of less than 90° to the central axis and which is in contact with the second disk surface at the second contact location.

BRIEF DESCRIPTION OF THE DRAWINGS

The invention is further described by way of examples with reference to the accompanying drawings in which:

FIG. 11A is a view in cross-section of the variator in a low ratio configuration, FIG. 11B illustrates on an enlarged scale a portion of the variator which is enclosed in a circle marked 11B in FIG. 11A, FIGS. 12A and 12B illustrate from opposing sides, in perspective, an adjustment device, FIGS. 19A and 19B are perspective and side views of an alternative embodiment of the variator, FIG. 19C illustrates a positioner which is used in the variator of FIGS. 19A and 19B.

DESCRIPTION OF PREFERRED EMBODIMENTS

Figure 1A:
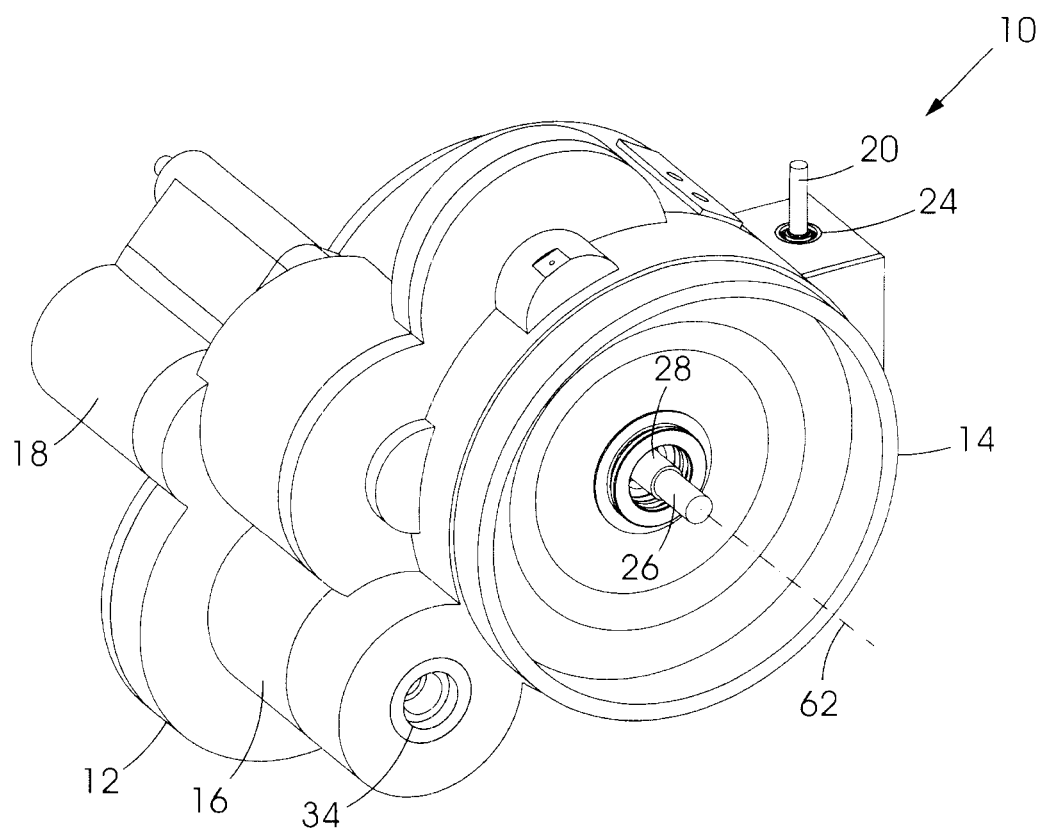
FIGS. 1A and 1B are views in perspective, from first and second sides respectively, of a continuously variable transmission (CVT) with a radial drive arrangement, according to the invention, which includes a casing structure, details of which are shown for example in FIGS. 2, 3A, 3B, 4A and 4B, and a variator, which is mounted inside the casing structure, details of which are shown for example in FIG. 6A.
Figure 1B:
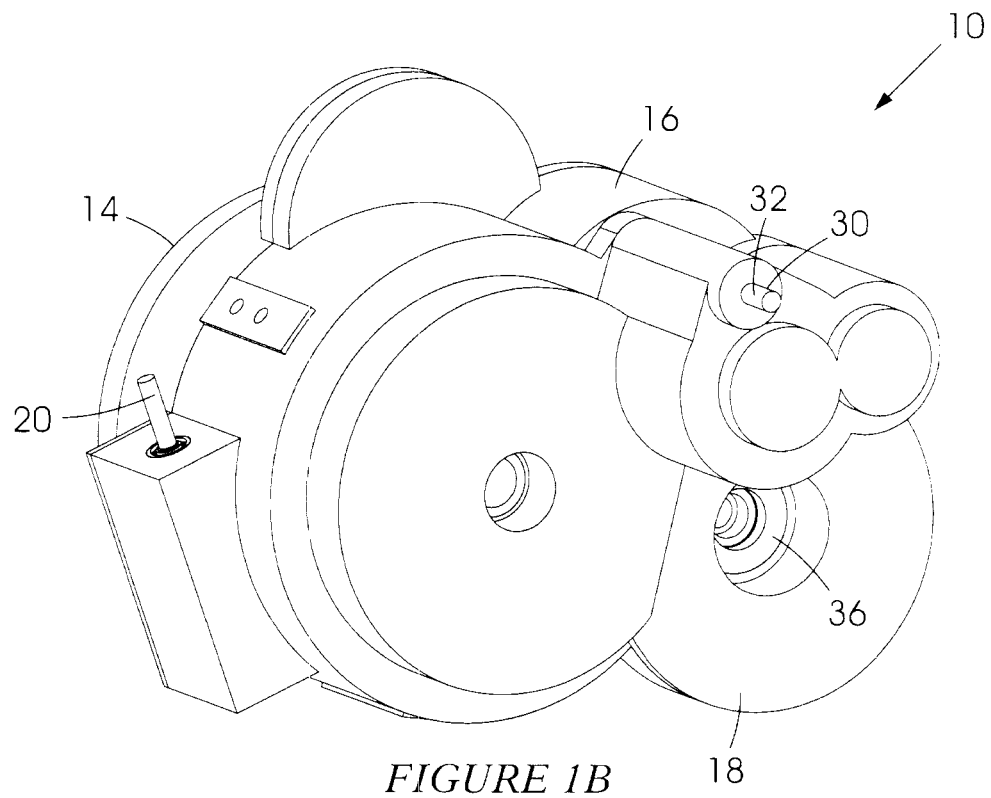

FIGS. 1A and 1B of the accompanying drawings illustrate, from opposing sides and in perspective, an external configuration of a continuously variable transmission (CVT) 10, with a radial drive arrangement, according to the invention.

The CVT 10 is described hereinafter with reference to its application for use in driving front wheels of a vehicle but this is by way of example only and is non-limiting.

Figure 2:
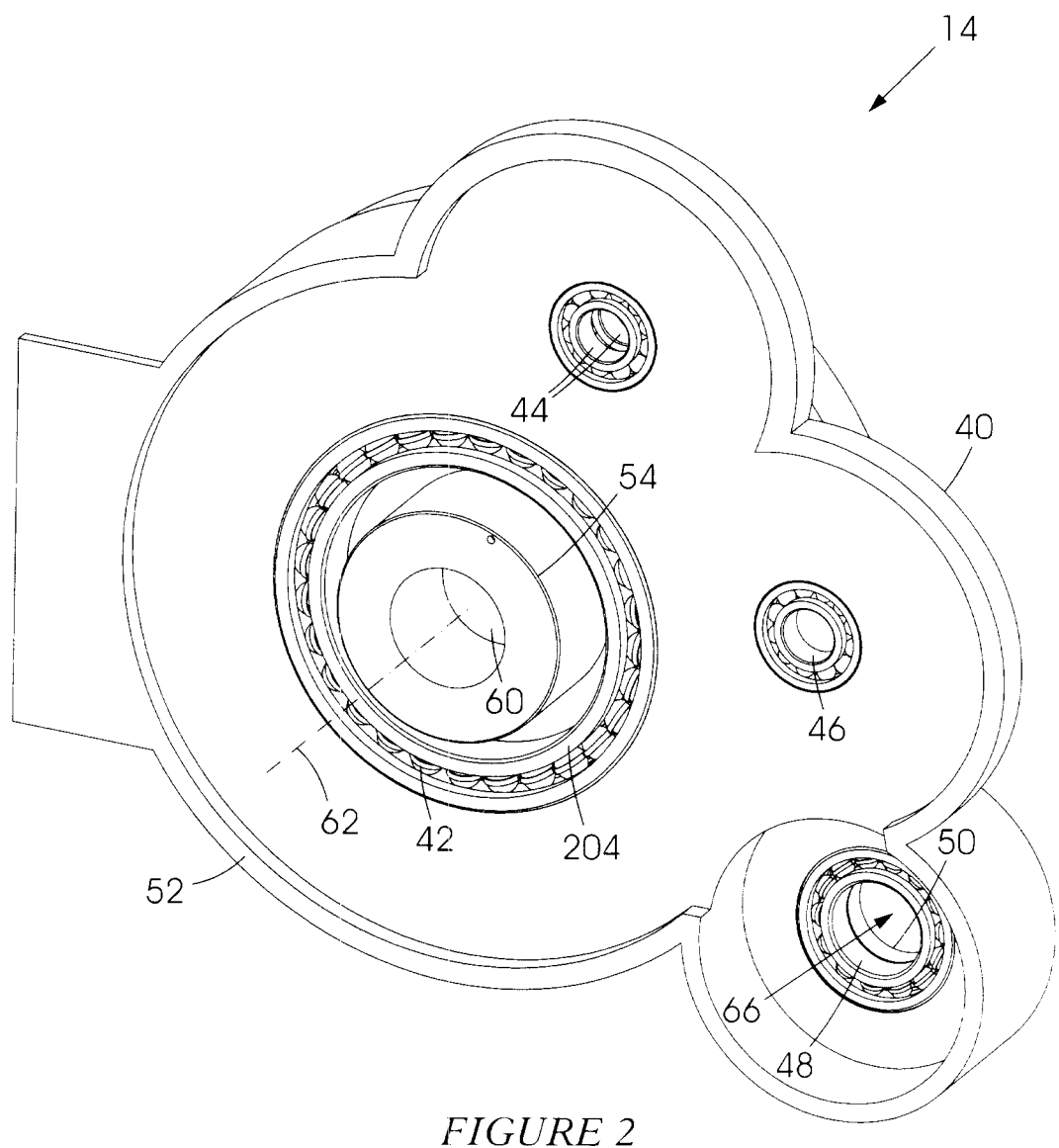
FIG. 2 illustrates in perspective an inner side of a front casing of the casing structure.
Figure 3A:
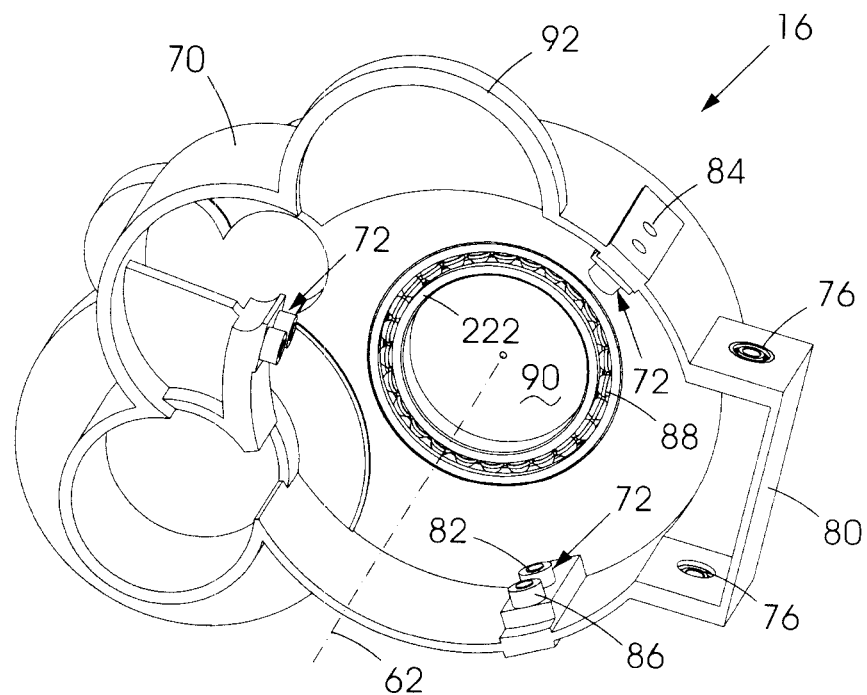
FIGS. 3A and 3B illustrate first and second sides of a middle casing of the casing structure, FIGS. 4A and 4B respectively illustrate a rear casing of the casing structure from an inner side and an outer side, FIG. 5A has two views respectively showing a front face and a rear face of a pressure ring, FIG. 5B has two views respectively showing a first side and a second side of a bearing insert, FIG. 6A, in an upper drawing, shows a variator which, in use, is mounted inside the casing structure shown in FIG. 1, from a first side and in a low ratio configuration, while a lower drawing shows the variator from a second side and in the low ratio configuration, FIG. 6B has upper and lower drawings which correspond respectively to those shown in FIG. 6A but with the variator in a high ratio configuration.

The CVT 10 includes a casing structure 12 which is formed from a front casing 14, a middle casing 16 and a rear casing 18 (see FIGS. 2, 3 and 4 respectively).

A part 20 of an adjustment device 22 (see FIGS. 12A and 12B) protrudes from a bearing 76 in the middle casing 16. An end 26 of an input shaft 28 (see FIG. 11A protrudes from one side of the front casing 14. A part 30 of a direction selector 32 extends from the rear casing 18.

The CVT 10 has a first wheel drive shaft connection 34 and a second wheel drive shaft connection 36.

The front casing 14, see FIG. 2, has a body 40 on which is mounted a front disk bearing 42, idler bearings 44, a first planetary bearing 46 and a first differential bearing 48. An oil seal 50 is positioned adjacent the differential bearing 48.

The body 40 has a peripheral coupling surface 52. The front disk bearing 42 is located around a protruding cup 54 through which extends a bore 60 centred on a longitudinal axis 62 through which the input shaft 28 (FIGS. 1A, 11A) extends. The first differential bearing 48 surrounds a bore 66 which coincides with the first wheel drive shaft connection 34 (FIG. 1B).

The middle casing 16 (FIGS. 3A and 3B) includes a body 70, three sets of two axially spaced rollers 72 which are spaced by 120° from one another on a circumference of a circle extending around the input axis 62, and two ratio bearings 76 located in bearing pockets in a protrusion 80 on a side of the body 70. Each roller 72 has a pin 82 which is secured in a respective radial hole 84, and a follower 86 which is rotatably engaged with the respective pin 82.

A rear disk bearing 88 which is slidable in an axial sense is located in a centre hole 90, of the body 70, which is concentric with the axis 62.

The body 70 has peripheral coupling surfaces 94 and 92 which allow the middle casing 16 to be securely engaged with the rear casing 18 and the front casing 14 respectively.

Figure 4A:
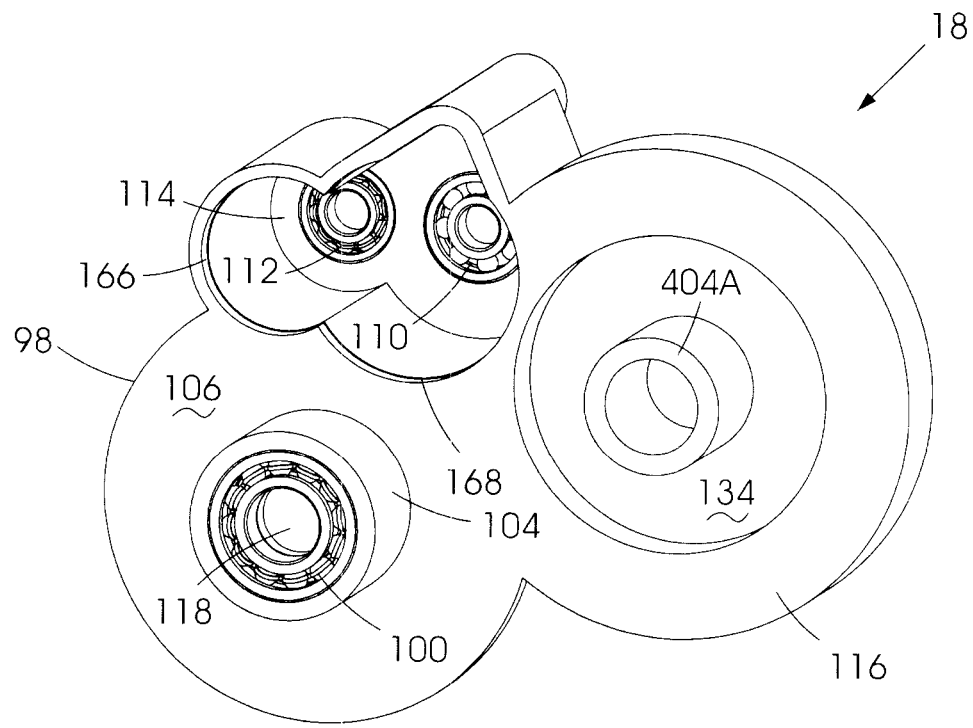
Figure 4B:
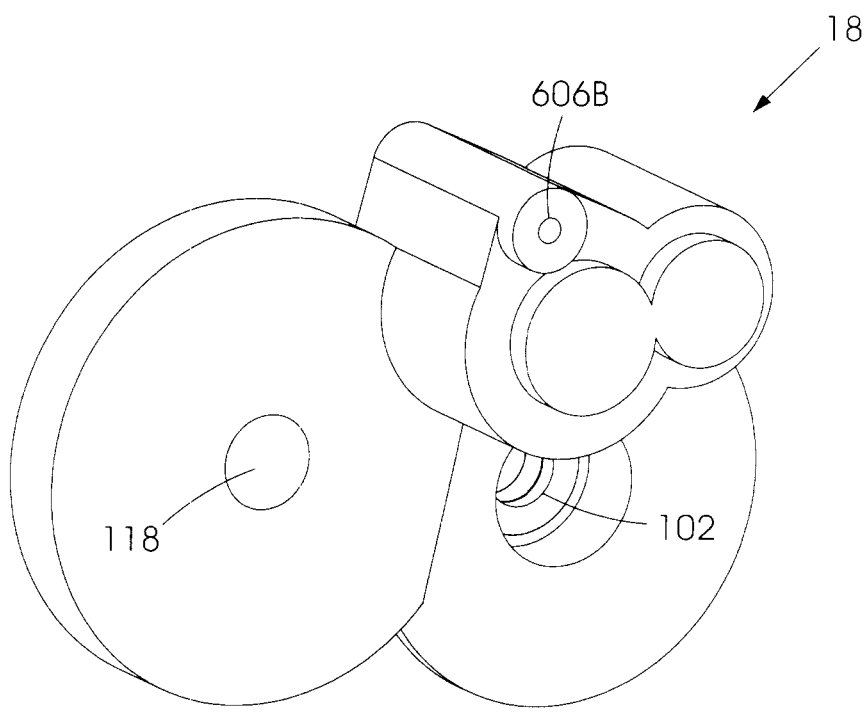

FIGS. 4A and 4B show the rear casing 18 which includes a body 98, a second differential bearing 100 and an oil seal 102 which are mounted in a cylindrical protrusion 104 on a mating face 106 of the body 98. A second planetary bearing 110 and a reverse bearing 112 are located in pockets, not shown, on a recessed surface 114 of a rear mating surface 116 of the body 98.

The second differential bearing 100 surrounds a bore 118 inside the protrusion 104 which is aligned with the second wheel drive shaft connection 36 (FIG. 1A).

FIGS. 1 to 4 do not illustrate connection structures, bolts and other fasteners etc. which are used, as is known in the art, to interconnect parts of the casing to one another in a structurally sound and oil tight manner.

Figure 5A:
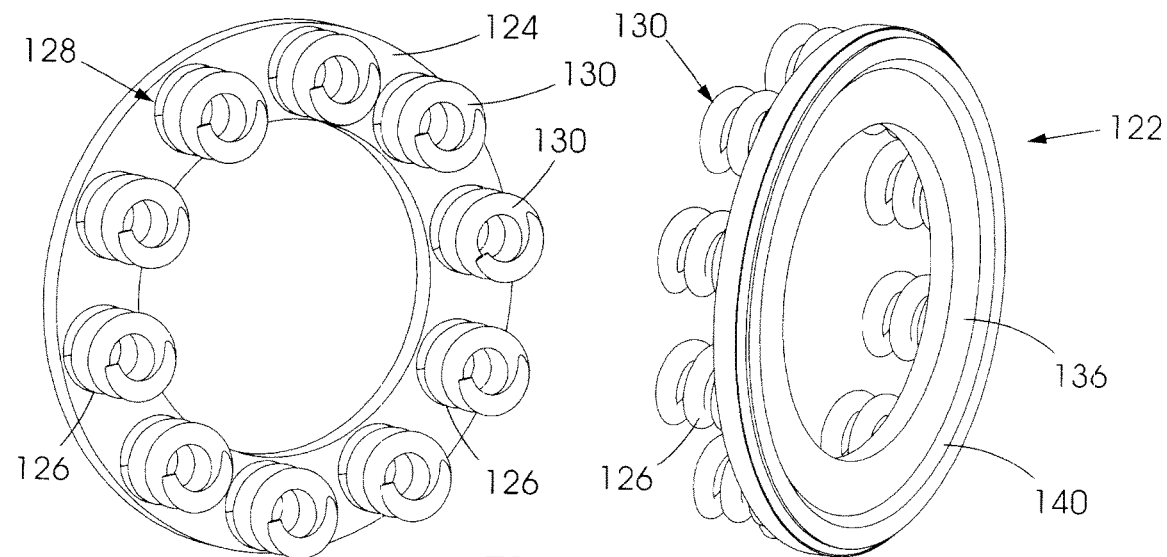

FIG. 5A has two views from opposing sides of a pressure ring 122 which includes an annular body 124 and ten compression springs 126 which are positioned at locations which are equally circumferentially spaced from one another on a front face 128 of the body 124. In use, free ends 130 of the springs 126 bear against a surface 134 of the rear casing 18—see FIG. 4A.

Figure 3B:
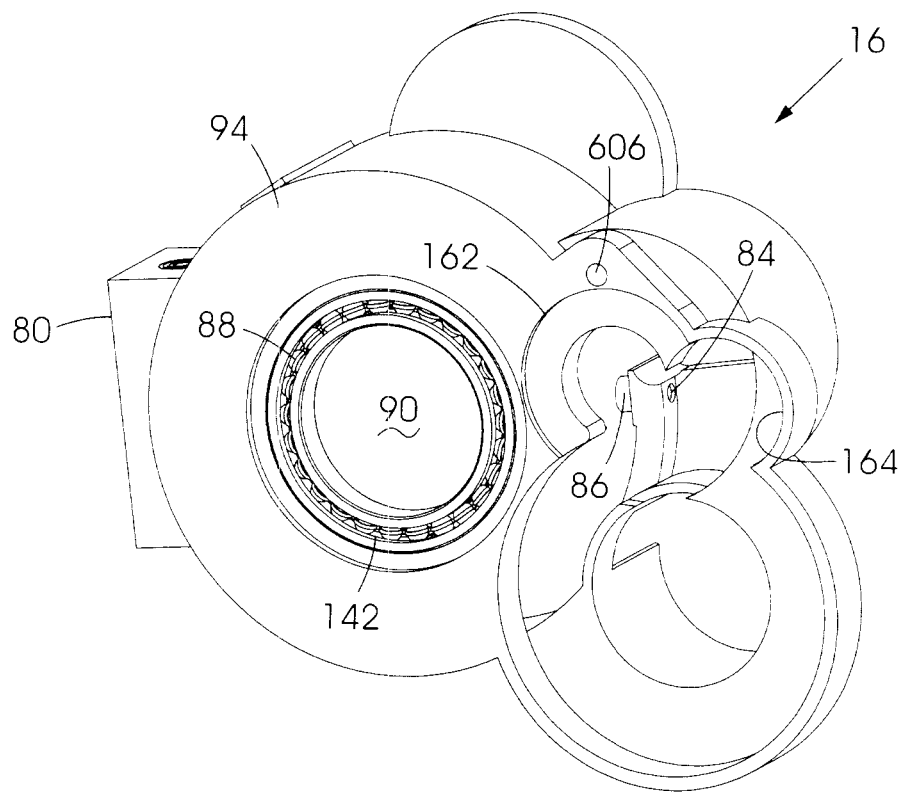

The annular body 124 includes at a periphery of a rear face 136 a protruding ring 140 which in use, bears against an outer ring face 142 of the rear disk bearing 88 of the middle casing 16—see FIG. 3B.

Figure 5B:
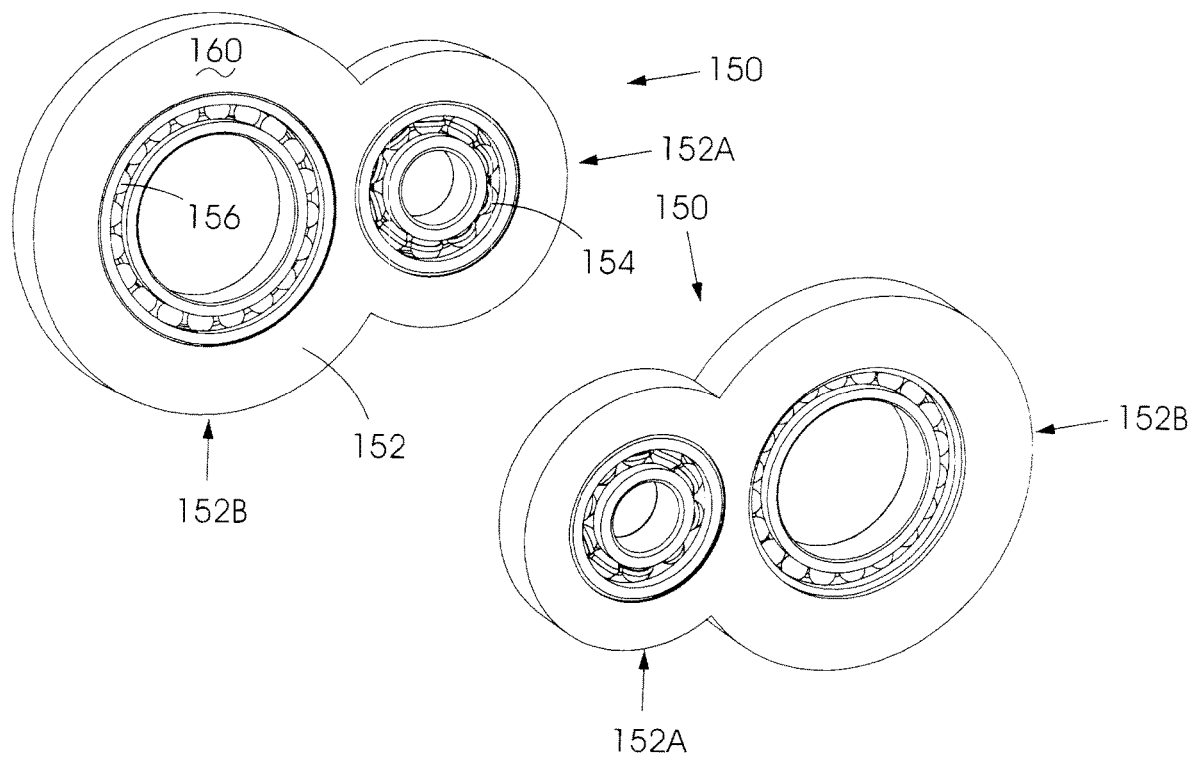

FIG. 5B has two views of a bearing insert 150 which includes a body 152 formed from two substantially circular components 152A and 152B respectively. A second reverse bearing 154 is centrally mounted to the component 152A and a forward bearing 156 is centrally mounted to the component 152B. The bearings 154 and 156 are flush with a front face 160 of the body 152.

In an assembled condition the bearing insert 150 is positioned in complementary formations 162 and 164 of the middle casing 16 and similarly shaped formations 166 and 168 of the rear casing 18.

Figure 6A:
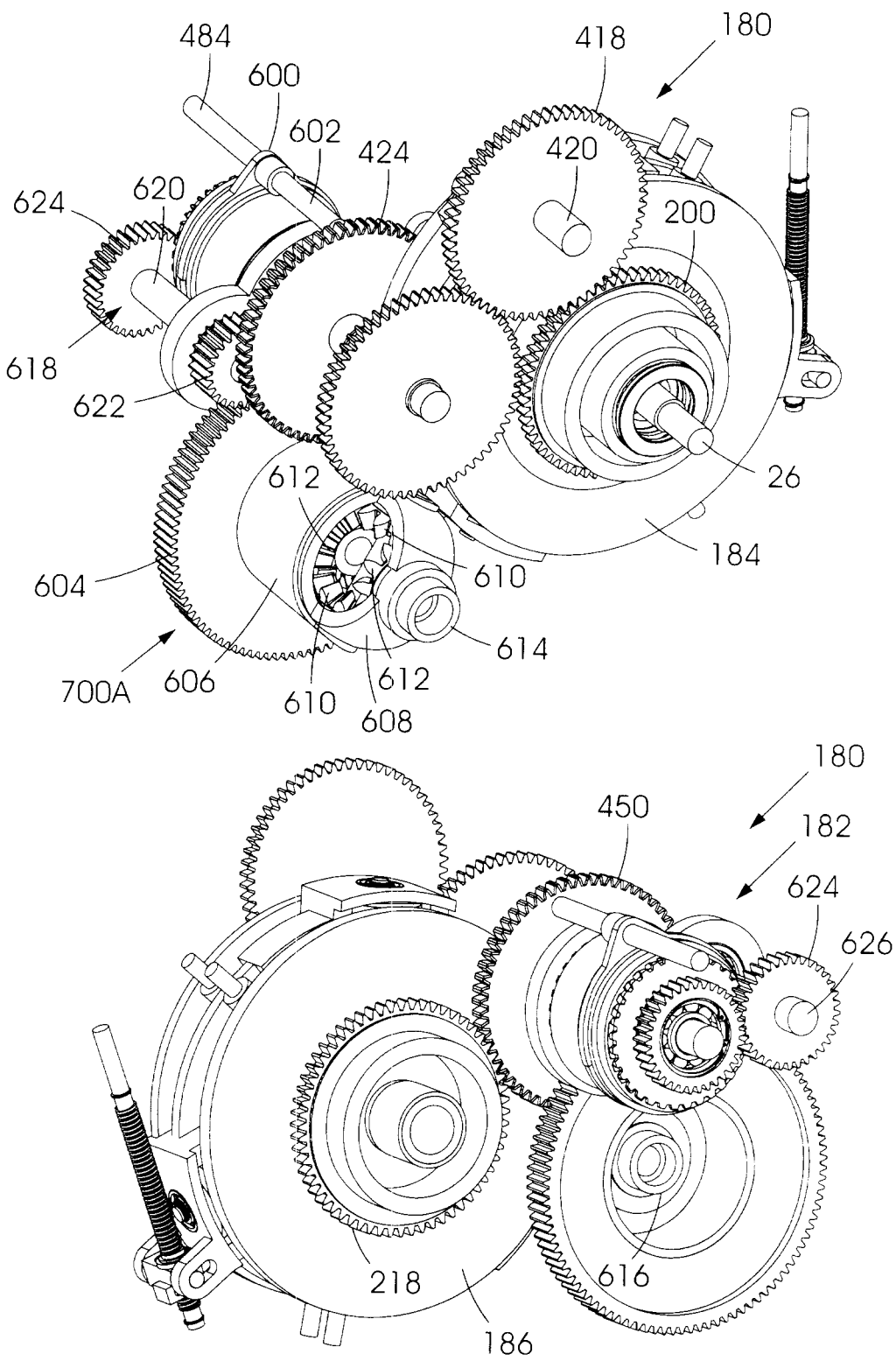
Figure 6B:
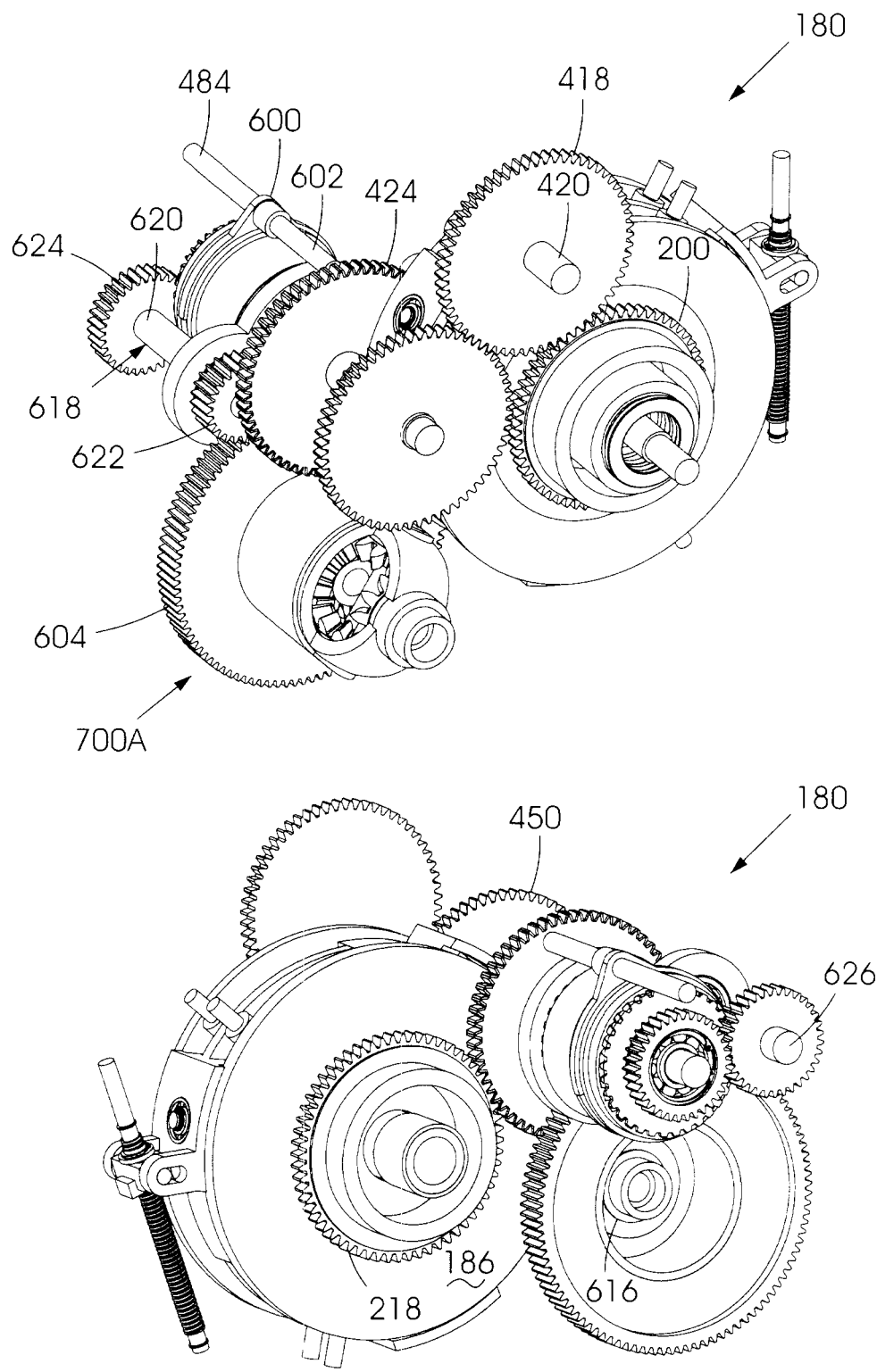
Figure 7:
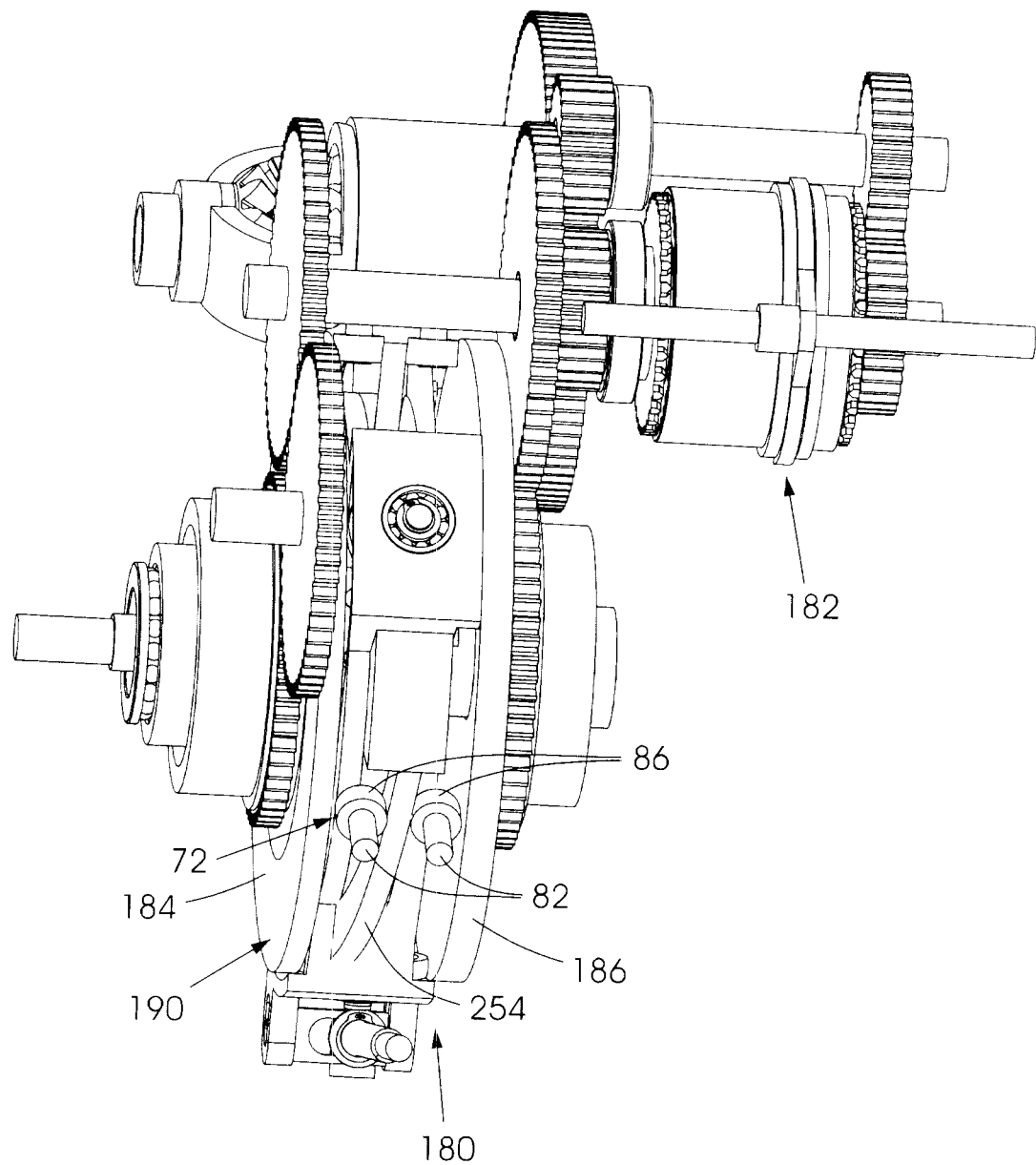
FIG. 7 is a plan view of the variator.
Figure 15A:
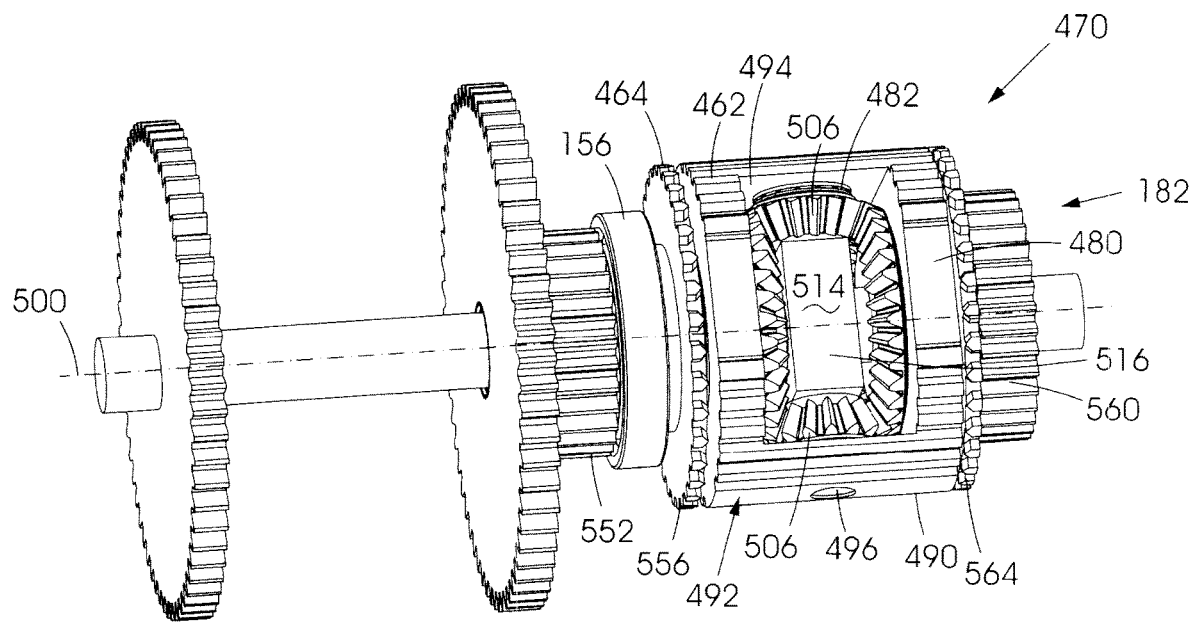
FIG. 15A is a perspective view, partly sectioned, of a speed balancing system made from the units shown in FIGS. 14A, 14B and 14C.
Figure 15B:
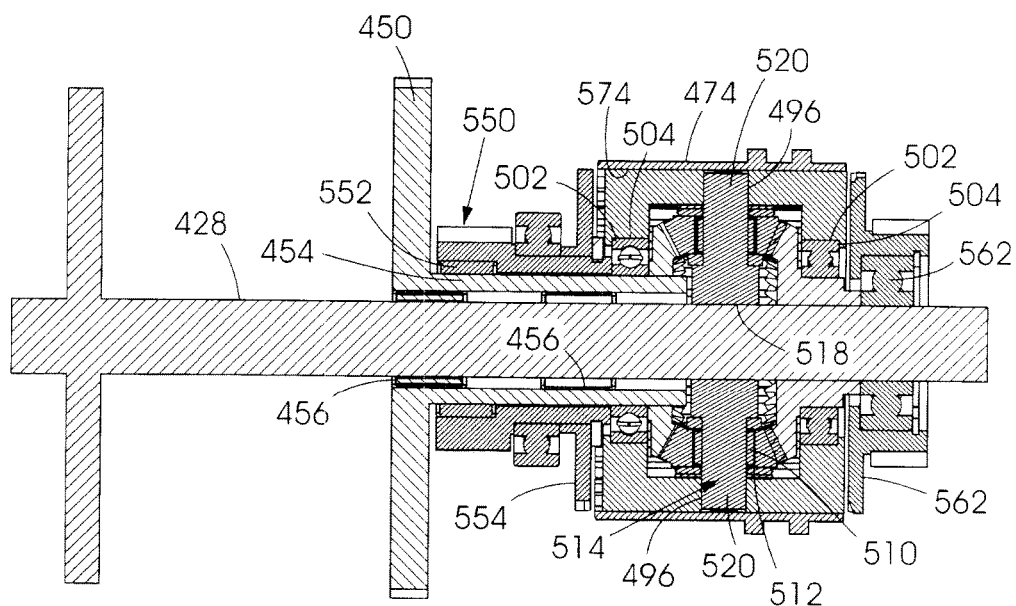
FIG. 15B shows the speed balancing system in cross-section and from one side.

FIGS. 6A and 6B each have two drawings showing from opposing sides a variator 180 which, in use, is mounted inside the casing structure 12. In FIG. 6A the variator is in a low ratio configuration; in FIG. 6B the variator is in a high ratio configuration. Attached to the variator, see for example FIG. 7, is a planetary speed-balancing system 182 details of which are shown in FIGS. 15A and 15B.

Figure 8:
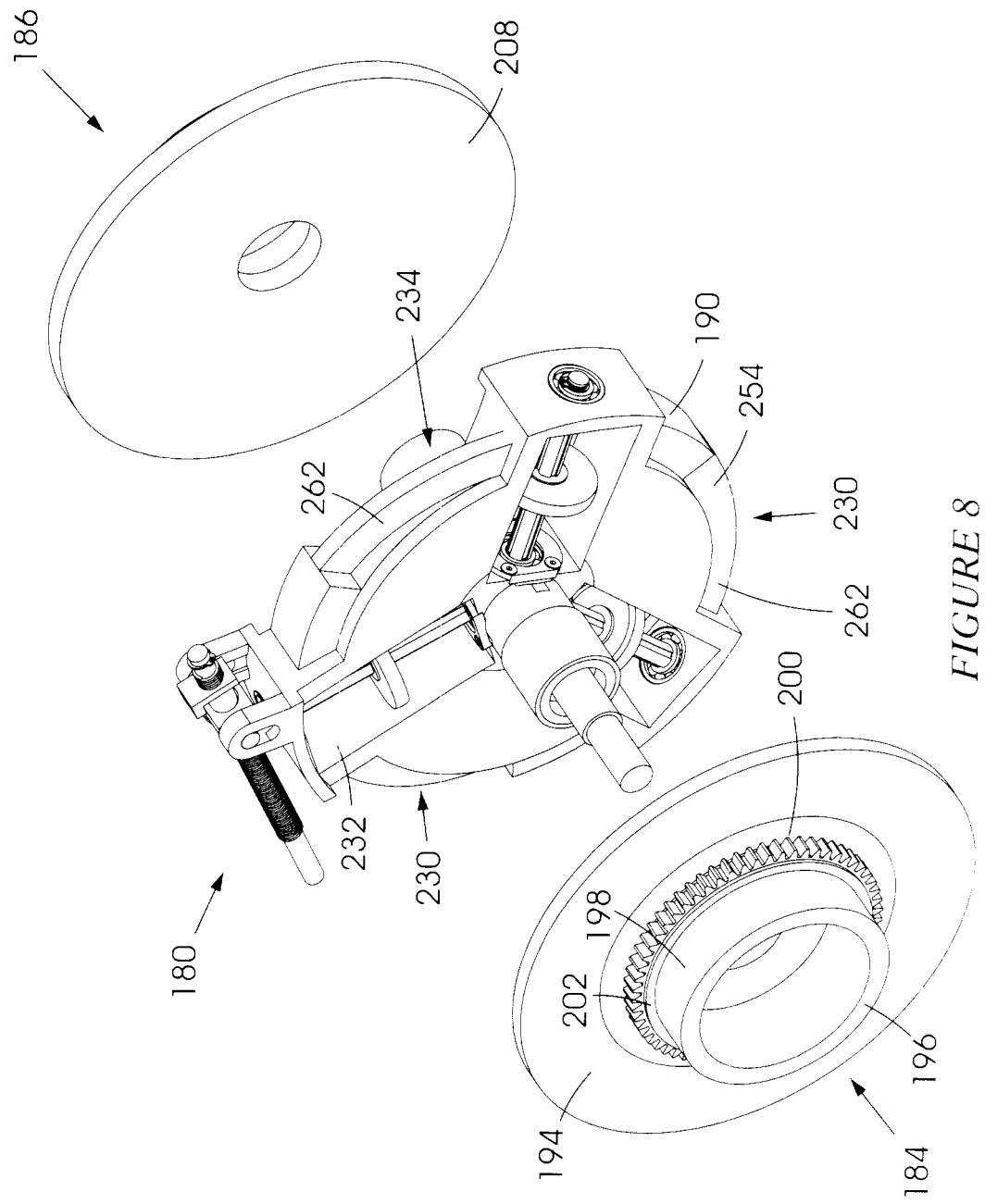
FIG. 8 is a perspective exploded view of components of the variator.
Figure 9:
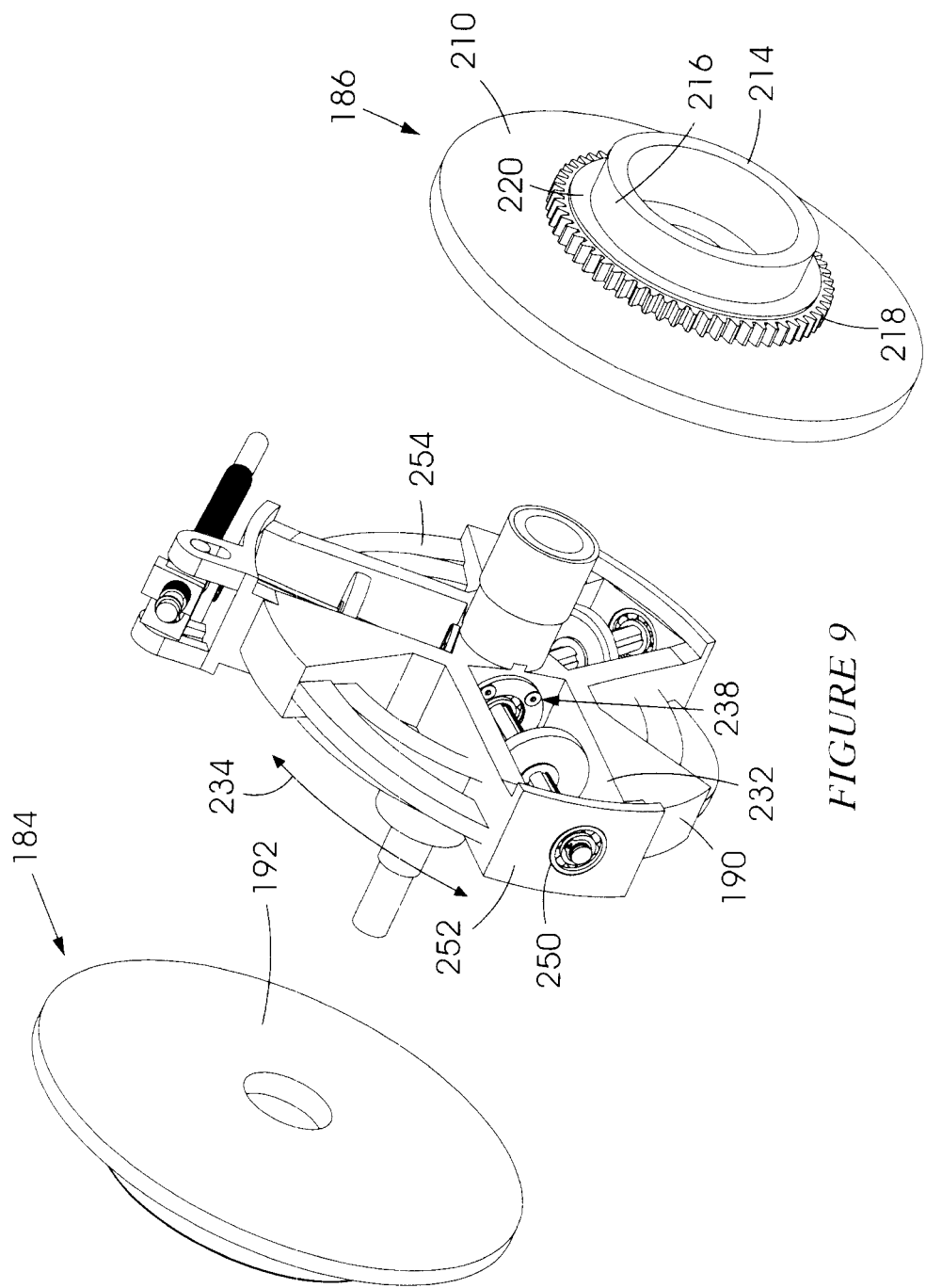
FIG. 9 shows the components of FIG. 8 from an opposing side.

FIGS. 8 and 9 are perspective exploded views, from opposing sides, of components of the variator 180.

The variator 180 includes a front disk 184, a rear disk 186 and a body 190.

The front disk 184 has a convex front face 192 formed by an outwardly tapering conical surface. On a rear face 194 the disk 184 has a cylindrical protrusion 196 with an outer cylindrical surface 198. At a junction with the face 194 the protrusion is enclosed by a spur gear 200. In use a face 202 of the spur gear 200 bears against a face 204 of the front disk bearing 42 included in the front casing 14. The bearing 42 functions as a radial, and as an axial, load-carrying bearing.

The rear disk 186 has a conical concave front face 208 formed by an inwardly tapering conical surface. The disk 186, on a rear face 210 is formed similarly to the front disk 184 in that it includes a cylindrical protrusion 214 with a cylindrical outer surface 216 and a spur gear 218 which surrounds a junction of the protrusion 214 and the rear face 210. In use a front face 220 of the spur gear 218 bears against a front face 222 of the rear disk bearing 88 in the middle casing 16. The disk bearing 88, in use, provides a radial and an axial load-carrying capability.

The convex conical angle of the convex front face 192 and the concave conical angle of the front face 208 may be equal or substantially equal.

The body 190 is generally circular in outline and includes three substantially similar segments 230 (see FIGS. 8-10). Each segment 230 has a respective generally rectangular cut-out 232 which is flanked by a curved portion 234 of the body. At a radial inner end the cut-out 232 has an annular shoulder 236 in which are formed four tapped holes 238. The shoulder 236 surrounds a hole 240 which extends to a central bore 242 which is positioned aligned with a central longitudinal axis 246 of the body.

At a radial outer side of each rectangular cut-out 232 a respective hole 250 extends through a peripheral portion 252 of the body 190.

Each curved portion 234 has, at an outer periphery, a spiralled rib 254 which has an outer surface 256 positioned on a radius RS from the axis 246. Opposing axial sides of each rib 254 form respective cam surfaces 260 and 262.

Axially aligned hollow shafts 264 and 266, which are concentric with the longitudinal axis 246, extend in opposing directions aligned with the axis 246. Each shaft 264, 266 carries a respective sleeve 268 and 270 at its outer end.

Two lugs 272 and 274 which are spaced apart in the direction of the axis 246, extend radially from one peripheral portion 252 and are positioned adjacent one of the rectangular cut-outs 232. The lugs 272 and 274 have respective elongate slots 276 and 278.

An input arrangement 280 extends from the shaft 266 (see FIG. 11) which includes an input shaft 282 with a bevel gear 284 at one end and splines 286 at an opposing end. A shoulder 288 is positioned between the bevel gear 284 and the splines 286.

A small diameter shaft 290 extends to one side of the bevel gear 284. Mounted in the bore 242 are two needle bearings 292, two thrust washers 294, a needle thrust bearing 296, an internal circlip 298 and an oil seal 300. The needle bearings 292 are secured in the bore 242 on the outside and on the inside thereby rotatably locating the input shaft 282 which is axially located via the thrust washers 294 and the circlip 298 which is engaged with a groove and which secures an outer thrust washer 294 to the bore 242. The other thrust washer 294 acts against the shoulder 288.

The input shaft 28 is internally splined at one end so that it can axially and slidably engage with and drive the splines 286 of the shaft 282.

Figure 10A:
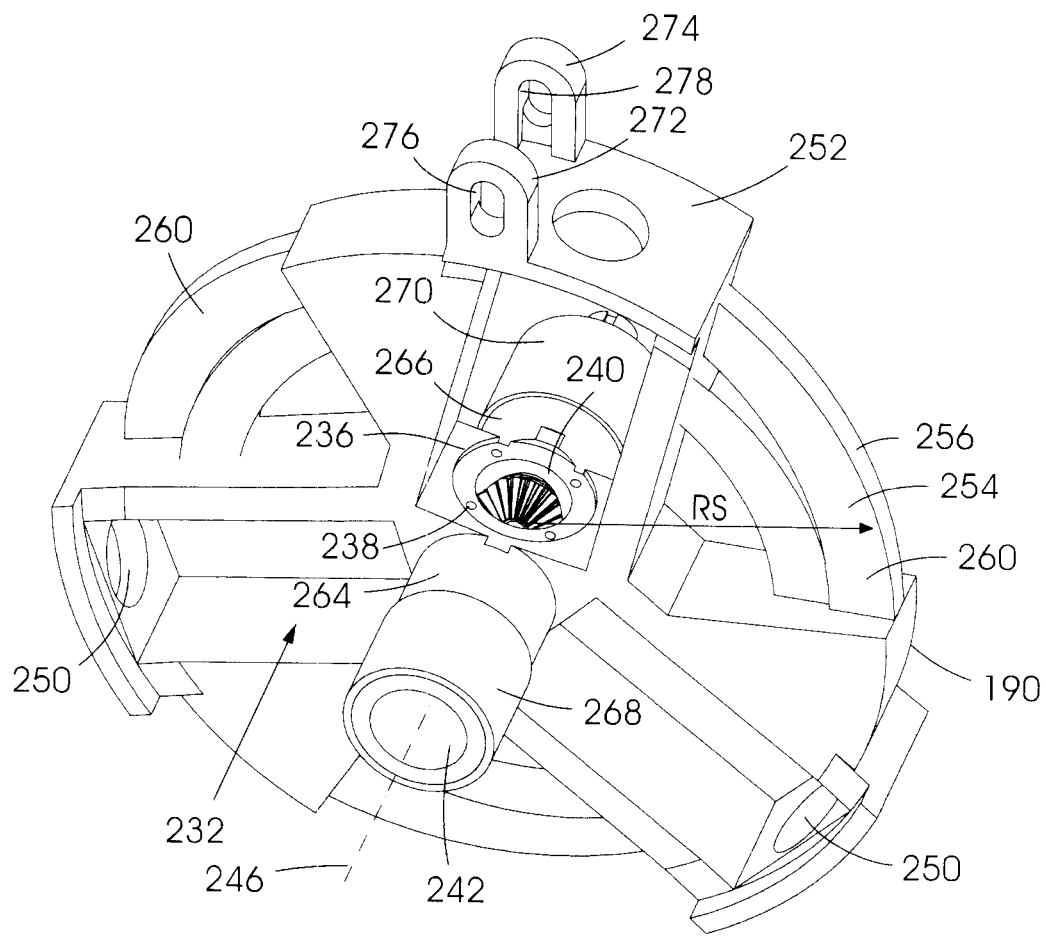
FIG. 10A shows in perspective a body of the variator.
Figure 10B:
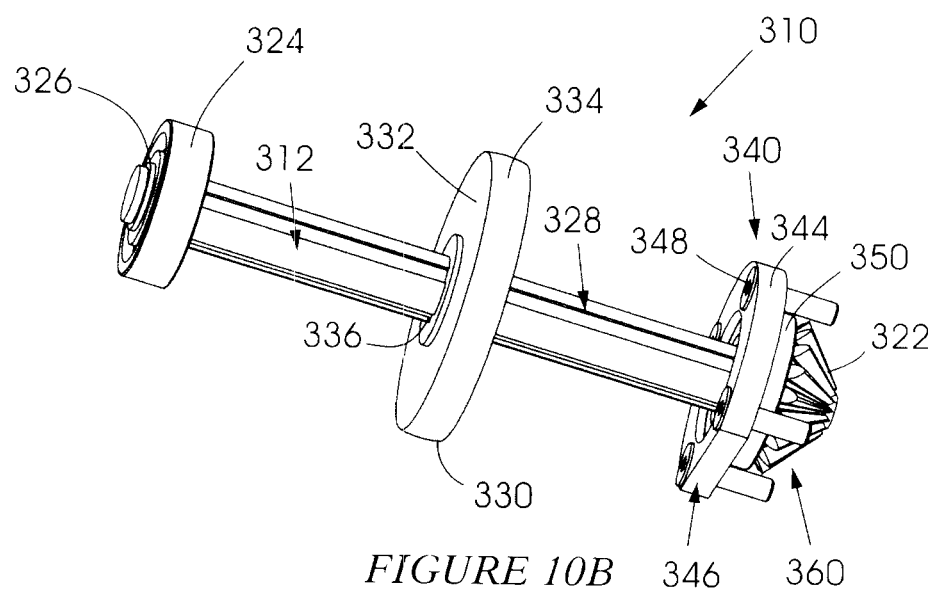
FIG. 10B shows in perspective a drive of the variator.

FIG. 10B shows a drive device 310 which includes a bevel drive shaft 312 with a bevel gear 322 at one end, a bearing 324 at an opposed end which is held in position by means of a circlip 326, and an intermediate portion of the shaft which includes splines 328. A driver 330 is located between the ends of the shaft 312. The driver 330 has a circular body 332 with an outer rim 334 which has a radius of curvature CR and a drive radius DR (see FIG. 11B). The body 332 has a splined centre bore 336 which is axially and slidably engaged with the splines 328.

A cup assembly 340 is positioned adjacent the bevel gear 322. The cup assembly 340 includes a cap 344 with four countersunk holes (not shown). The cap has a peripheral flat clearance surface 346. Countersunk bolts 348, located in the countersunk holes, are in use engaged with the tapped holes 238 so that the cap 344 secures a cap bearing 350 to the body 190. An inner surface of the cap bearing 350 rotatably positions the bevel drive shaft 312 in the body 190. An opposing end of the drive shaft 312 is rotatably secured to the body 190, by engaging an outer side of the bearing 324 with a respective hole 250 in the body 190. A leading end of the bevel gear 322 bears against the shaft 290 (FIG. 11A).

Figure 12A:
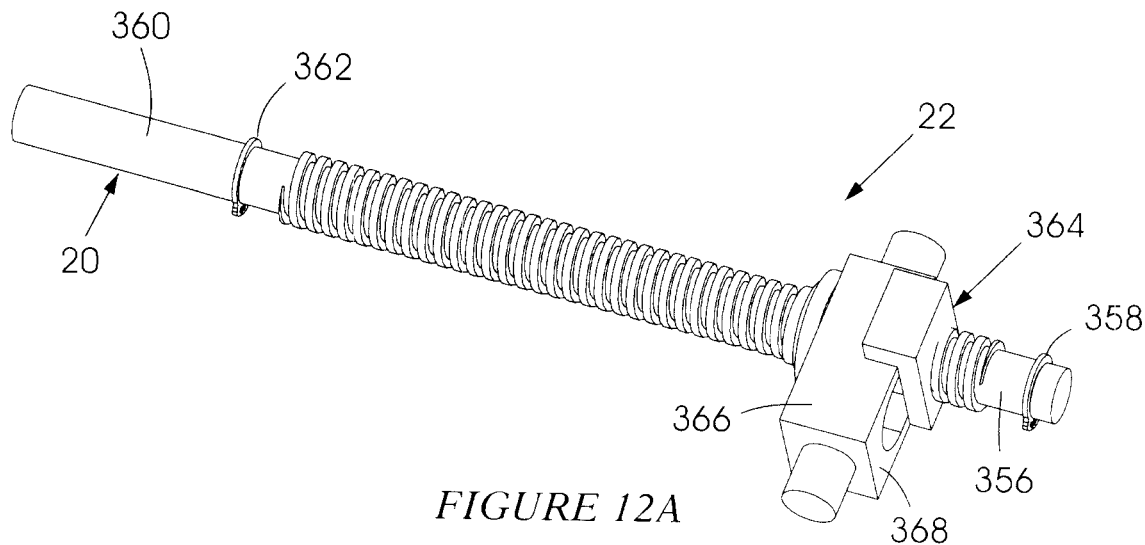
Figure 12B:
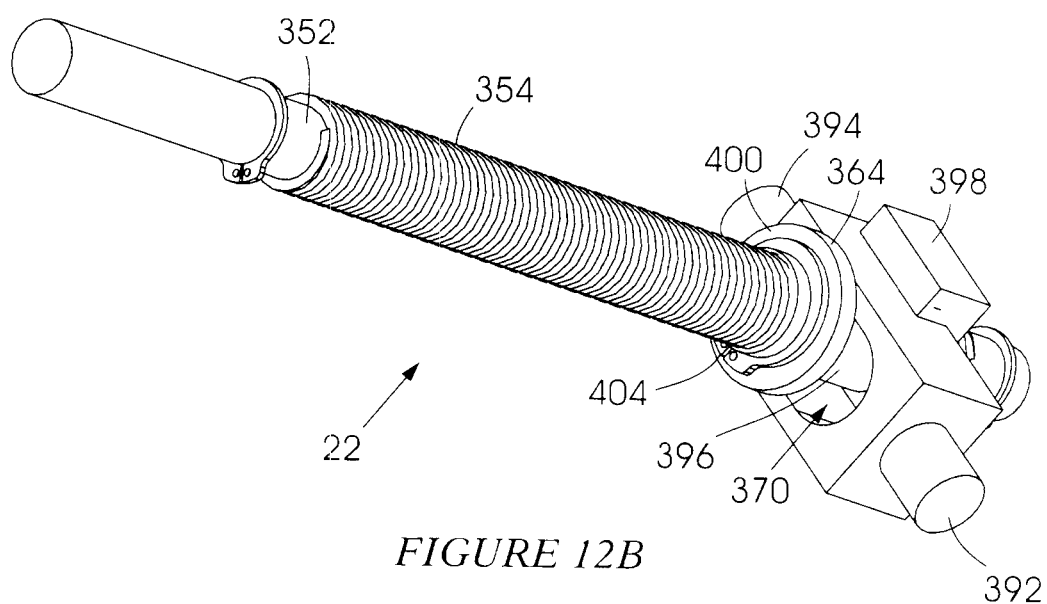

FIGS. 12A and 12B are perspective views from opposing sides of the adjustment device 22 referred to in connection with FIGS. 1A and 1B. The adjustment device includes a ratio shaft 352 which has a screw thread 354 in a central region and a shaft extension 356 at one end. A circlip 358 is used to secure one ratio bearing 76 (FIG. 3) to the shaft extension 356. At an opposing end the ratio shaft 352 has a shaft extension 360. A circlip 362 is used to secure the other ratio bearing 76 to the shaft extension 360.

An end of the shaft extension 360 forms the part 20 referred to in connection with FIGS. 1A and 1B.

A lead screw nut 364 and a bracket 366 are engaged with the thread 354. The bracket 366 has a rectangular body 368 with a slotted hole 370, and studs 392 and 394 at opposing ends. The lead screw nut 364 has a circular body 396 which is centrally threaded to engage with the thread 354. A rectangular hook 398 extends from the body 396 and passes over the rectangular body 368. A washer 400, which abuts an opposing side of the body 368 is kept in place by means of a circlip 404. In use this arrangement prevents the lead screw nut 364 from rotating with the thread 354 together with the ratio shaft 352, while allowing the circular body 396 to move with a sliding action along the length of the slotted hole 370.

The studs 392 and 394 are respectively engageable with the elongate slots 276 and 278 of the lugs 272 and 274 (FIG. 10A). To facilitate assembly one of the studs 394 and 392 may screw into the rectangular body 368. The ratio shaft 352 is rotatably secured in the middle casing 16 by means of the two ratio bearings 76 and, when rotated, adjusts the position of the lead screw nut 364 along the thread 354. The position of the bracket 366 on the screw thread 354 is simultaneously adjusted and the body 190 is rotated to some extent around the axis 246 (FIG. 10A) due to the engagement of the studs 394 and 392 with the slots 276 and 278.

The ratio shaft 352 may be adjusted in any suitable way, for example by means of an automatically or manually controlled electric motor.

The sleeve 270 is rotatably engaged with and is axially slidable relative to the central bore 60 of the front casing 14. Similarly the sleeve 268 is rotatably engaged with and is axially slidable relative to a central bore 404A on the rear casing 18—see FIG. 4A. The cam surfaces 260 and 262 of the ribs 254 are respectively in line contact with the followers 86 of the two axially spaced rollers 72 (FIGS. 3A and 3B), with the rib 254 between the rollers 72. When the body 190 is rotated around the axis 246 relative to the middle casing 16, the followers 86 ride on the cam surfaces of the ribs and, because of the spiral shape of each rib 254, the body 190 is axially displaced.

The drivers 330 are between the front disk 184 and the rear disk 186 and are subjected to a clamping force exerted by the compression springs 126 on the rear disk 186, via the rear disk bearing 88. The rims 334 of the drivers 330 are in point contact with the conical convex front face 192 of the front disk 184 and in point contact with the conical concave front face 208 of the rear disk 186 thereby creating a friction drive between the drivers 330 and the front and rear disks 184, 186 which are then rotated in opposite directions. Interfaces of the friction drive interface are implemented through the use of hardened and polished steel-on-steel contact points which operate in a traction fluid similar to that used in commercial belt and pulley, and toroidal, CVTs in the automotive and allied industries, yielding a coefficient of friction in the order of 0.1. Alternatively the friction drive interface may be implemented through the use of steel on friction material contact points.

The bevel gears 322 of the drive device 310 mesh with the bevel gear 284 of the input arrangement 280 to allow a power source, attached to the input shaft 28, to drive the input shaft 282. In turn the bevel drive shafts 312 are rotated and impart rotational drive to the drivers 330 and, as explained, the front and rear disks 184, 186 are then counter-rotated.

FIG. 11A shows the drive device 310 with a driver 330 displaced by a maximum extent from the respective bevel gear 322. The driver is in point contact with the front disk 184 and the rear disk 186 (radius Rmax=maximum). In this position the variator 180 is in its lowest ratio and the speed of the front disk 184 and of the rear disk 186 is at a minimum. In FIG. 11A the body 190 is shown displaced to the right to a maximum extent.

As the shaft 352 is rotated the body 190 is rotated via the adjustment device 22 and, due to the actions of the followers 86 which are in contact with the cam surfaces 260 and 262, is also moved axially to the left in FIG. 11. The drivers 330 are forced inwardly to a smaller radius, taken from the axis 246, via the actions of the convex front face 192 and the concave rear face 208 which respectively present angled surfaces which are in point contact with the drivers 330.

Figure 13:
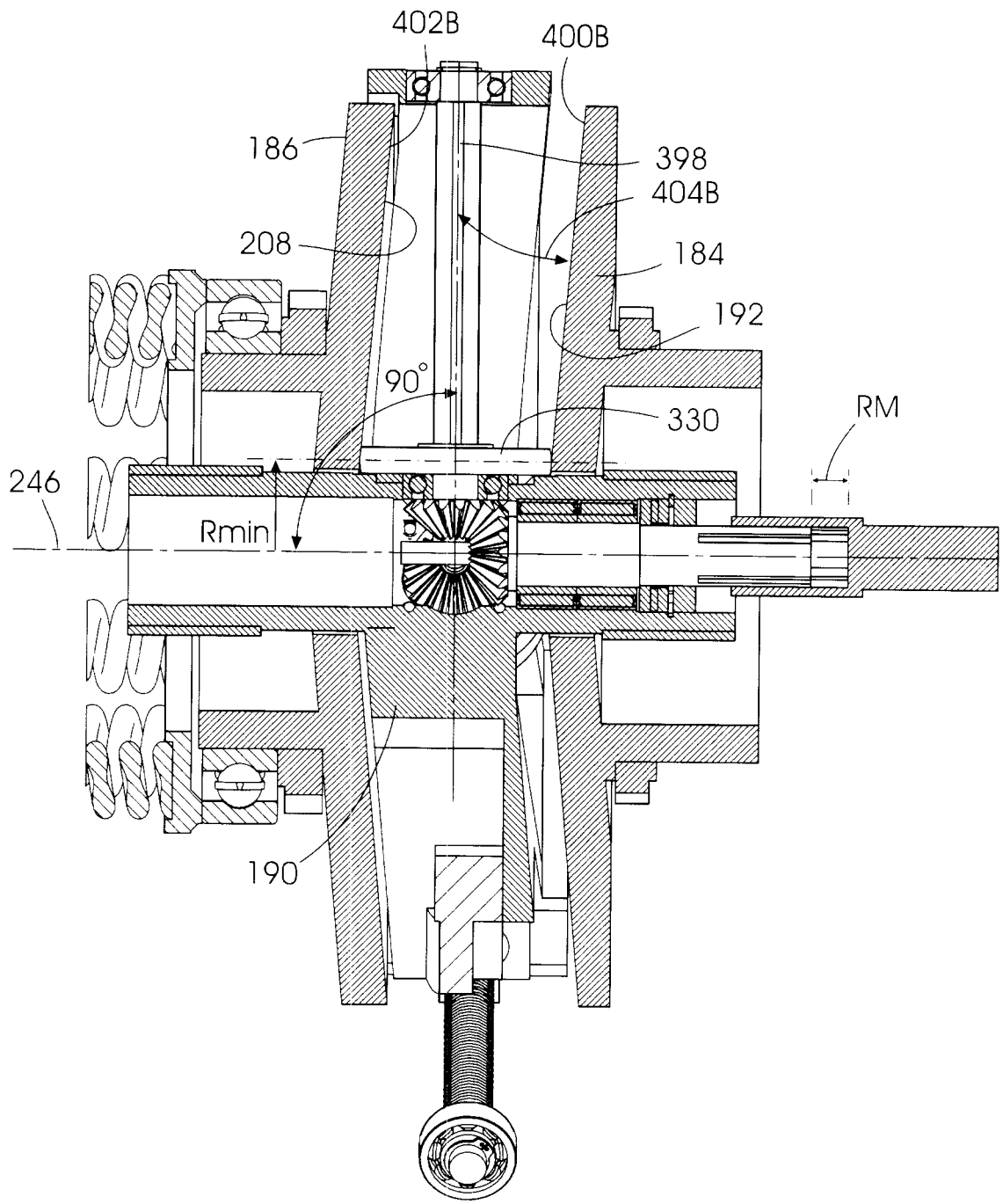
FIG. 13 is similar to FIG. 11A but with the variator in a high ratio configuration, FIGS. 14A, 14B and 14C respectively show a front input unit, a rear input unit and a planetary unit.

FIG. 13 shows the drivers 330 at a minimum radius Rmin from the axis 246. The body 190 has been moved to the left from the position in FIG. 11A by a distance of RM.

Each bevel drive shaft 312 has an axis 398 which is perpendicular to the axis 246. The convex front face 192 and the concave rear face 208 have parallel, radially extending contact lines 400B and 402B respectively at an angle 404B relative to the axis 398. A similar situation prevails if the front faces 192 and 208 are flat (i.e. not convex nor concave respectively), parallel to each other and perpendicular to the axis 246. However the axis 398 of the bevel drive shaft 312 must then be at an angle which is not a right angle relative to the axis 246.

In general terms the surfaces 192 and 208 are parallel to each other, but not to the axis 398. This ensures that the body 190 is moved axially upon radial movement of the drivers 330.

The radial distance of each driver 330 from the axis 246 can be adjusted without any actuator acting directly between the driver 33C) and the splined shaft 312 on which the drivers are axially slidably located. This is because the convex front face 192 and the concave front face 208 are not parallel to the axis 398.

The variator 180 thus functions to generate a drive ratio between the input shaft 28 and the counter-rotating front and rear disks 184 and 186 respectively. The drive ratio can be varied by altering the radial distance of the drivers 330 from the axis 246.

FIG. 11B shows on an enlarged scale a driver 330 in contact with the front face 192 of the front disk 184 at a point 406 and in contact with the front face 208 of the rear disk 186 at a point 408. Due to the contact radius DR and the angles (inclinations) of the faces 192 and 208, the points 406 and 408 are not equally spaced in a radial sense from the driver axis 246. Thus the front and rear disks 184 and 186 counter-rotate at slightly different speeds. As the radial difference value remains the same for different radial positions of the driver 330 the difference in the rotational speeds of the front and rear disks changes with radial movement of the driver 330. Thus the disks 184 and 186 cannot be directly coupled together by means of a device with a fixed gear ratio. However it might be possible to couple the front disk 184 directly to the rear disk 186, if the curvature radius CR is sufficiently small so that a small speed difference between the rotational speeds of the disks would be acceptable.

FIG. 6A shows the variator 180 in a low ratio configuration i.e. with each driver 330 at the Rmax position shown in FIG. 11A. FIG. 6B shows the variator 190 in a high ratio configuration with each driver 330 at the Rmin position shown in FIG. 13.

Figure 14A:
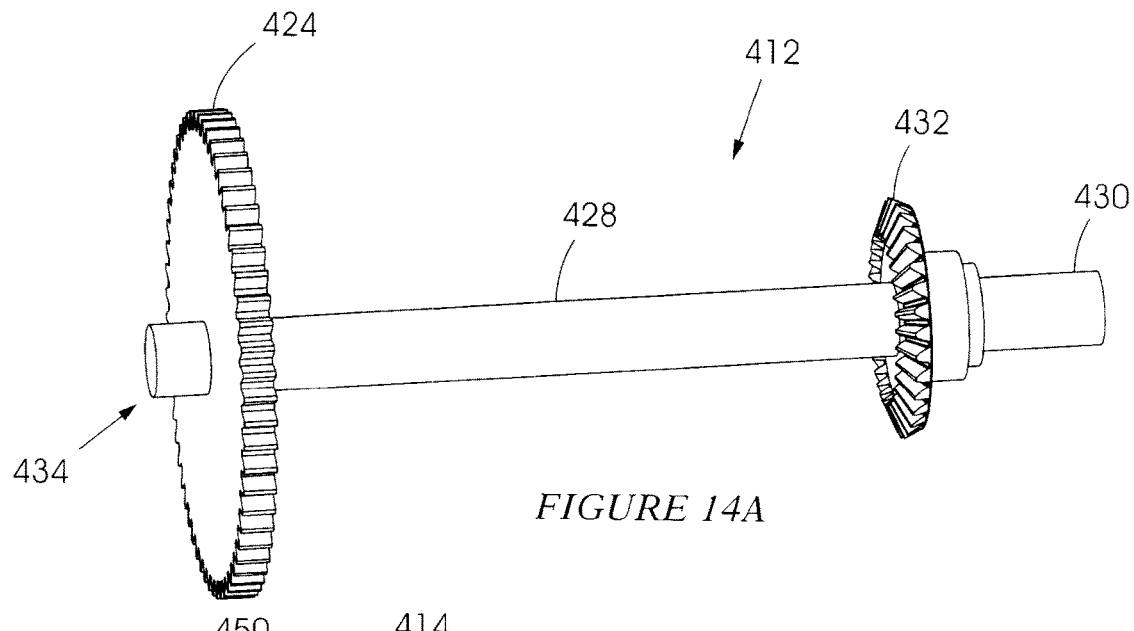
Figure 14B:
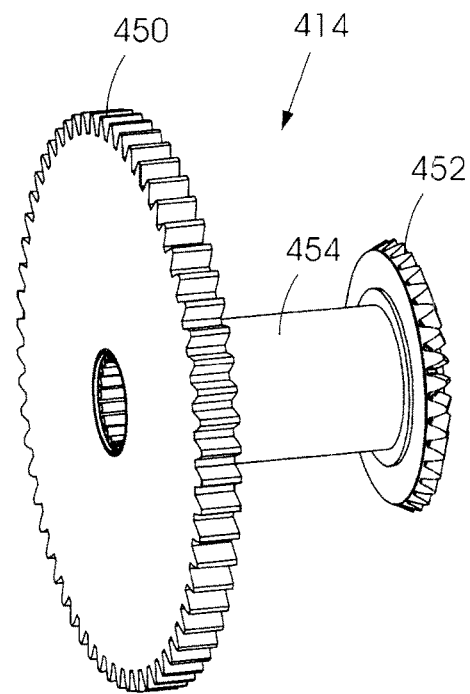
Figure 14C:
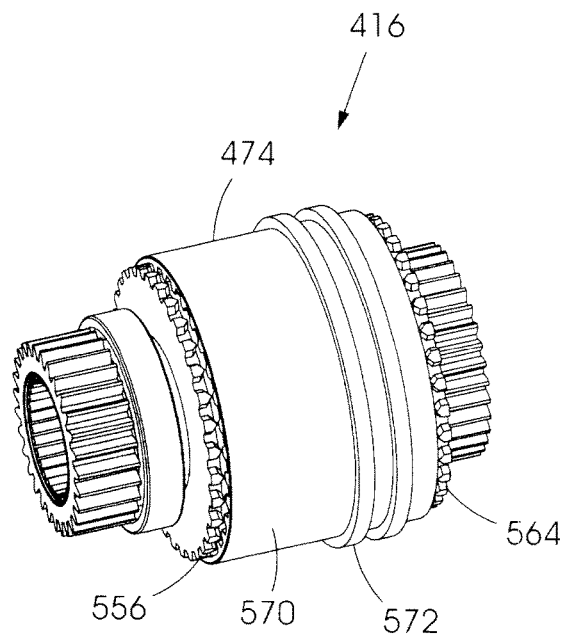

The planetary speed balancing system 182 (see FIGS. 14 and 15) is used to couple outputs of the front and rear disks (184, 186) together in a mechanically effective manner to produce a single or combined output drive. The speed balancing system 182 includes a front input 412, a rear input 414 and a planetary unit 416.

The front input 412 engages with an idler gear 418 with an attachment shaft 420 which is rotatably mounted with the two idler bearings 44 in the front casing 14 (see upper drawing in FIG. 6A). The input 412 includes a front input gear 424 attached to a shaft 428 which at an end 430, carries a bevel gear 432. An opposing end 434 of the shaft 428 is rotatably engaged with the first planetary bearing 46 in the front casing 14. The end 430 of the shaft 428 is rotatably engaged with the second planetary bearing 110 in the rear casing 18. The front input gear 424, the idler gear 418 and the spur gear 200 have the same number of teeth. The idler gear 418 meshes with the spur gear 200 and the front input gear 424.

The rear input 414 has a rear input gear 450 which is coupled to a bevel gear 452 via a hollow shaft 454 which has two spaced apart needle bearings 456 in its bore (FIG. 15B). In use the needle bearings 456 run on the shaft 428. The rear input gear 450 has the same number of teeth as, and is meshed with, the spur gear 218—see FIG. 6A.

The bevel gear 432 of the front input 412 and the bevel gear 452 of the rear input 414 rotate in the same direction with a speed difference between the front and rear inputs attributed to the difference between the driving radius of the front disk 184 and the driving radius of the rear disk 186, at points 408 and 406 respectively, with each driving radius measured from the axis 246.

The planetary unit 416 has a cage unit 462, a forward unit 464, a reverse unit 470 and a dog sleeve 474.

The cage unit 462 includes a cage 480, a spider bearing arrangement 482 and a selector 484—see upper drawing in FIG. 6A. The cage 480 has a generally cylindrical body 490 with outer splines 492, a centrally positioned rectangular hole 494 and two holes 496 at a base of the rectangular hole 494. The holes 496 are concentric and lie on an axis which intersects an axis 500 of the body 490. Bearings 502 respectively located in spaced apart pockets 504 support the cage 480.

The spider bearing arrangement 482 has two bevel spider gears 506. Each respective bevel spider gear 506 has a needle bearing 510 in its bore and a needle thrust bearing and washer arrangement 512 at its base. A centrepiece 514 of the arrangement 482 includes a rectangular body 516 with a centrally positioned hole 518 and studs 520 on opposing sides. Each stud is located in a respective hole 496 of the cylindrical body 490. The hole 518 is concentric with the shaft 428. The needle bearings 510 respectively run on the studs 520. The bevel spider gears 506 can rotate freely around their respective axes in a manner similar to that which exists in an automotive differential unit.

To facilitate assembly at least one of the studs 520 is screwed into the centrepiece 514.

The bevel gear 432 and the bevel gear 452 have the same number of teeth and are meshed with the bevel spider gears 506 to create a planetary gear system.

The forward unit 464 has a forward gear 550 which carries a needle bearing 552 in its centre bore. The forward unit 464 is attached to a forward dog ring 554 which has dog teeth 556 on its rim. The forward bearing 156 of the bearing insert 150 is secured between the forward gear 550 and the forward dog ring 554. An inner surface of the needle bearing 552 runs on an outer side of the hollow shaft 454 thereby allowing the forward unit 464 to be axially secured to and to be freely rotatable around the hollow shaft 454.

Similarly, the reverse unit 470 has a reverse gear 560 with a bearing 562 at a central bore. A reverse dog ring 562 on one side has dog teeth 564, on its rim, which are identical to the dog teeth 556. An inner surface of the bearing 562 is secured to the shaft 428. The reverse unit 470 is thereby axially secured to and is freely rotatable around the shaft 428.

The dog sleeve 474 has a hollow cylindrical body 570 with two spaced apart raised grooves 572 on an outer side and splines 574 on an inner side which mate with the splines 492 of the cage 480. The splines 574 also mate with the dog teeth 564 and the dog teeth 556 in such a way that the dog sleeve 474 is axially slidable around the cylindrical body 490.

FIG. 15B shows the dog sleeve 474 in a neutral position at which it is not engaged with the dog teeth 564 nor with the dog teeth 556.

If the dog sleeve 474 is moved to the left in FIG. 15B it engages with the dog teeth 556 and couples the forward unit 464 to the cage 480. If the dog sleeve 474 is moved to the right in FIG. 15B it engages with the dog teeth 564 and couples the reverse unit 470 to the cage 480. The dog sleeve 474 is not shown in FIG. 15A in order to clarify the illustration.

Referring to FIG. 6A the selector 484 includes a selector fork 600 attached to a selector shaft 602 which is axially and slidably located in a hole 606 in the middle casing 16 and in a hole 606B in the rear casing 18—see FIGS. 3B and 4B. The selector fork 600 is engaged with the raised groove 572 on either side and provides a means for actuating the dog sleeve 474 from a location outside of the casing structure 12 via an extension of the selector shaft 602, referred to as the direction selector 32 in connection with FIG. 1. Such actuation can be manually or automatically effected.

In operation the front input 412, the rear input 414 and the planetary unit 416 create the planetary gearing (speed balancing) system 182 with an e-value equal to −1, and with the cage 480 serving as a planetary gearing cage or arm. This system caters for the difference in the rotational speeds of the front input 412 and of the rear input 414. Thus the rotational speed of the cage 480=(speed of the front input 412+speed of the rear input 414)/2.

The aforementioned expression is for e=−1 but the speed balancing system 182 could have an e-value other than −1.

The sizes and teeth numbers of the gears and bevel gears are designed to optimise operation. The gears may be spur, helical, bevel or spiral bevel gears in order to address performance and cost factors.

FIGS. 6A and 6B illustrate a differential 700B which is coupled to the speed balancing system 182 and which includes a gear 604 attached, via a hollow shaft 606, to a differential cage 608 which contains spider gears 610 and side shaft bevel gears 612 (similar to those found in automotive drive train differentials), in order to provide drive to left and right wheels, via suitable splines on the first and second wheel drive shaft connections 34 and 36 (see FIGS. 1A and 1B).

A front differential end 614 is secured in the first differential bearing 48 in the front casing 14 (FIG. 2) and a rear differential end 616 is secured in the second differential bearing 100 in the rear casing 18 (FIGS. 4A and 4B).

The gear 604 meshes with the forward gear 550 to provide forward drive in a vehicle in which the variator is included when the dog sleeve 474 is positioned to the left of the position shown in FIG. 15.

A reverse shaft 618 includes a shaft 620 with a gear 622 on one side and a gear 624 on an opposing side. The shaft 620 has a section 626 which extends beyond the gear 624. The shaft section 626 is rotatably secured in the first reverse bearing 112 in the rear casing 18 (FIG. 4), while the shaft 620 is rotatably secured in the second reverse bearing 154 of the bearing insert 150 (FIG. 5). The gear 624 and the reverse gear 560 of the reverse unit 470 have the same number of teeth and are meshed with each other. The gear 622 is meshed with the gear 604.

In an operative arrangement the dog sleeve 474 is positioned to the right of the position shown in FIG. 15 so that it engages with the dog teeth 564 and couples the reverse unit 470 to the cage 480. In this way reverse drive for the vehicle is provided via the reverse shaft 618. In order to change the direction of rotation of the gear 604 and so change the direction in which the vehicle is moving, the front input gear 424 and the spur gear 200 can be sized to mesh with each other, the spur gear 218 and the rear input gear 450 can be sized not to mesh with each other, and the idler gear 418 can be relocated to mesh with the spur gear 218 and with the rear input gear 450.

The variator 180 may be coupled to an internal combustion engine using a launching device such as a clutch or torque converter. The end 26 of the input shaft 28 is typically externally splined to engage with internal splines of a clutch plate.

Figure 16B:
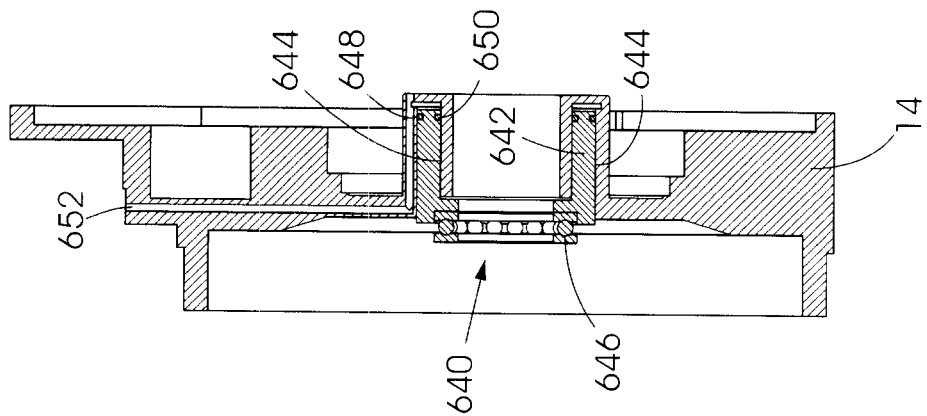
FIG. 16B shows the piston system of FIG. 16A from one side and in cross-section.
Figure 16A:
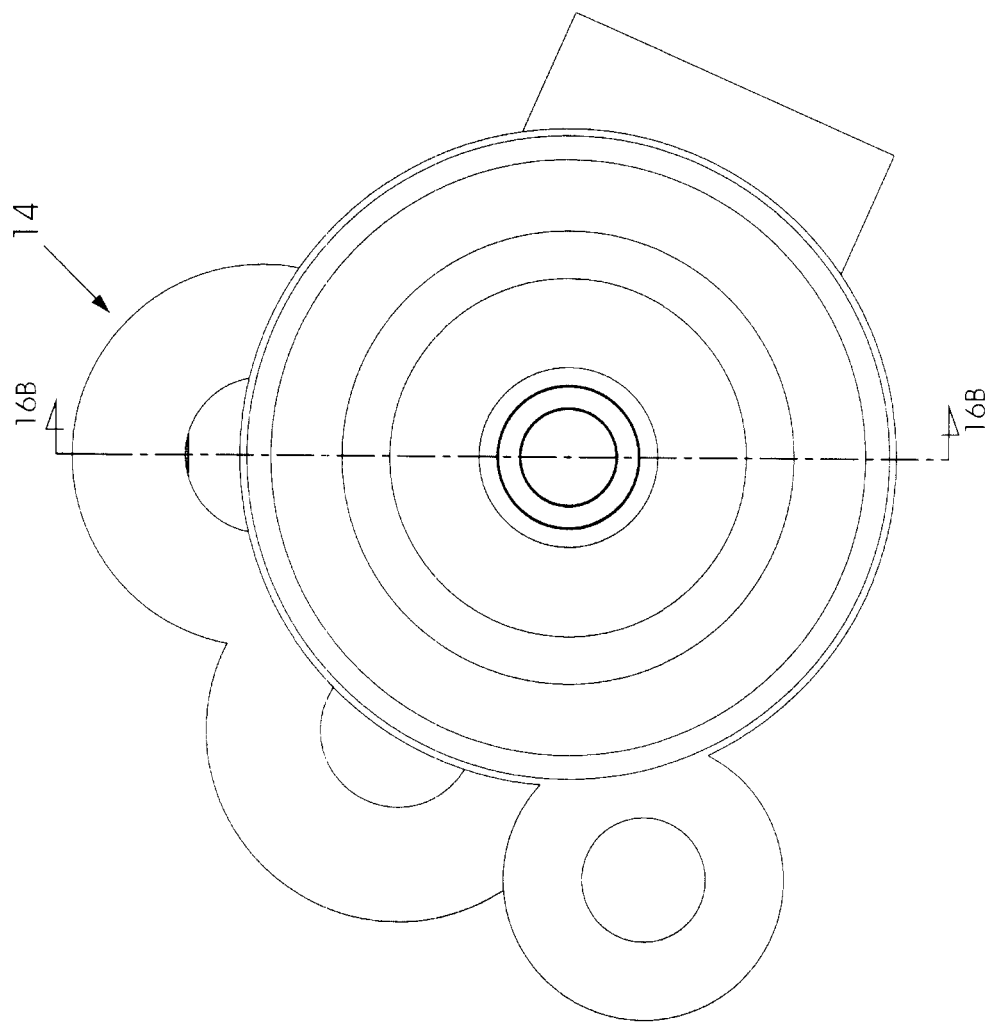
FIG. 16A is an end view of a hydraulically actuated piston system.

FIG. 16 shows a hydraulic actuation piston system 640 which is integrated into the front casing 14 and which is used to actuate a manual transmission clutch. A hollow cylindrical piston 642 is located in an axially extending, cylindrical blind groove 644 in the front casing 14. The piston 642 carries on a front end a clutch thrust bearing 646 and, on a rear end, an external O-ring groove 648 and an internal O-ring groove 650. Each groove 648, 650 carries a respective O-ring thereby to establish a seal between sides of the piston 642 and sides of the cylindrical blind groove 644. Hydraulic fluid to the piston system 640 is supplied via a channel 652 from a side of the front casing 14 to a base of the cylindrical blind groove 644.

When fluid pressure is applied, via a manually operated pedal or automatically, the piston 642, via the thrust bearing 646, actuates a pressure plate (not shown) of the manual transmission clutch.

Figure 17:
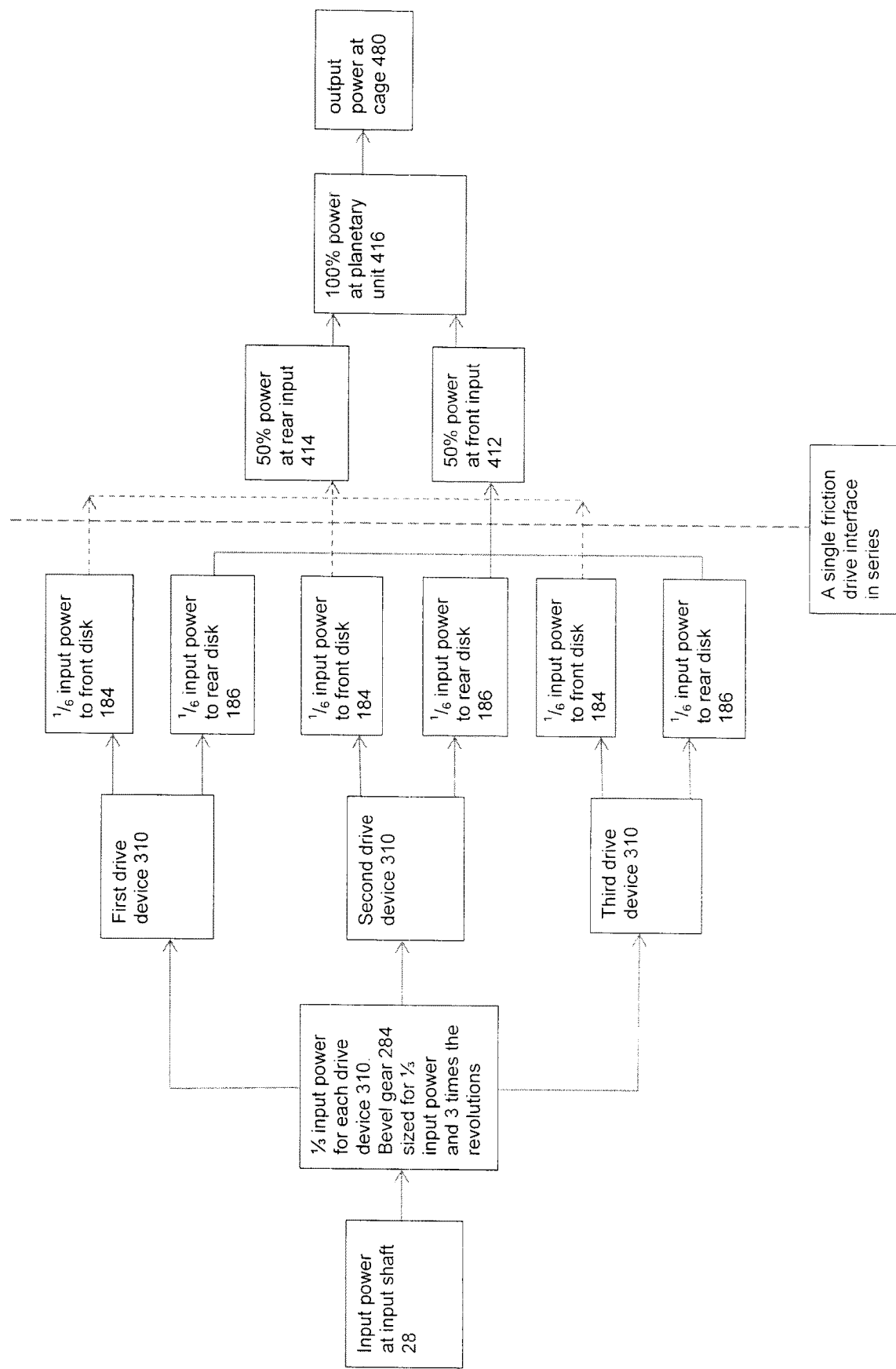
FIG. 17 is a block diagram illustrating power flow through different paths in the variator.

FIG. 17 shows a power flow diagram of the variator 180. It is apparent that each friction interface handles one-sixth of the power which is transmitted. This is a significant benefit in that the power which is transmitted by a friction interface does not pass through a second friction interface.

The driver 330 has a driving radius DR (see FIG. 11B) which remains constant in all ratios. Therefore for all ratios, a tangential friction force at the point of contact with the front disk 184, and with the rear disk 186, remains the same for a given input torque at the input shaft 28. Thus the clamping force which is created by the ten compression springs 126 is also constant in all ratios. The two tangential friction forces, produced at the respective points of contact of the driver 330 with the front disk 184 and with the rear disk 186, are in opposite directions with the result that minimal radial forces are exerted on the splined drive shaft 312 via the driver 330 (FIG. 10B).

The number of segments 230, and thus the number of drive devices 310, may be less than three (as described herein) or more than three.

As previously indicated a problem which could occur with a vehicle, in which a CVT is installed, is that at standstill the CVT might not be capable of transmitting sufficient torque to enable the vehicle to overcome an obstacle such as a kerb. The arrangement shown in FIG. 18 addresses this problem.

An extension shaft 700 includes a spur gear 702 on one end and a bevelled gear, not shown, on an opposing end, which meshes with the three bevel gears 322 of the drive devices 310 so that the spur gear 702 turns at the same speed as the input shaft 28 but in an opposing direction. The extension shaft 700 is supported by a bearing 704 which is located in the rear casing 18. The spur gear 702 meshes with a gear 706 which, via a sprag 708, drives a gear 710. The gear 710, via a silent chain 712, drives a gear 714 which is attached to the cage 480.

The ratio between the spur gear 702 and the cage 480 (via the gears 706, 710 and 714) is the same as the ratio between the spur gear 702 and the cage 480 (via the bevel gears 322, the drivers 330, the front disk 184 and the rear disk 186) when the drivers 330 are at the maximum radius Rmax from the axis 246 of the input shaft 28 (FIG. 11A).

The sprag 708 is configured to engage if the speed of the gear 706 exceeds the speed of the gear 710 while both are rotating in a direction indicated by an arrow 716. Thus the only situation in which the sprag 708 would lock is when the drivers 330 are in the Rmax position and when more torque than what the drivers could handle is required. In the absence of the sprag 708 the drivers 330 would start to slip at their respective points of contact with the front disk 184 and the rear disk 186—an event which could cause damage to these components. Thus the modified variator is bypassed when the drivers 330 are in the lowest ratio, i.e. at a radial displacement of Rmax from the axis 246 of the input shaft 28.

Figure 18:
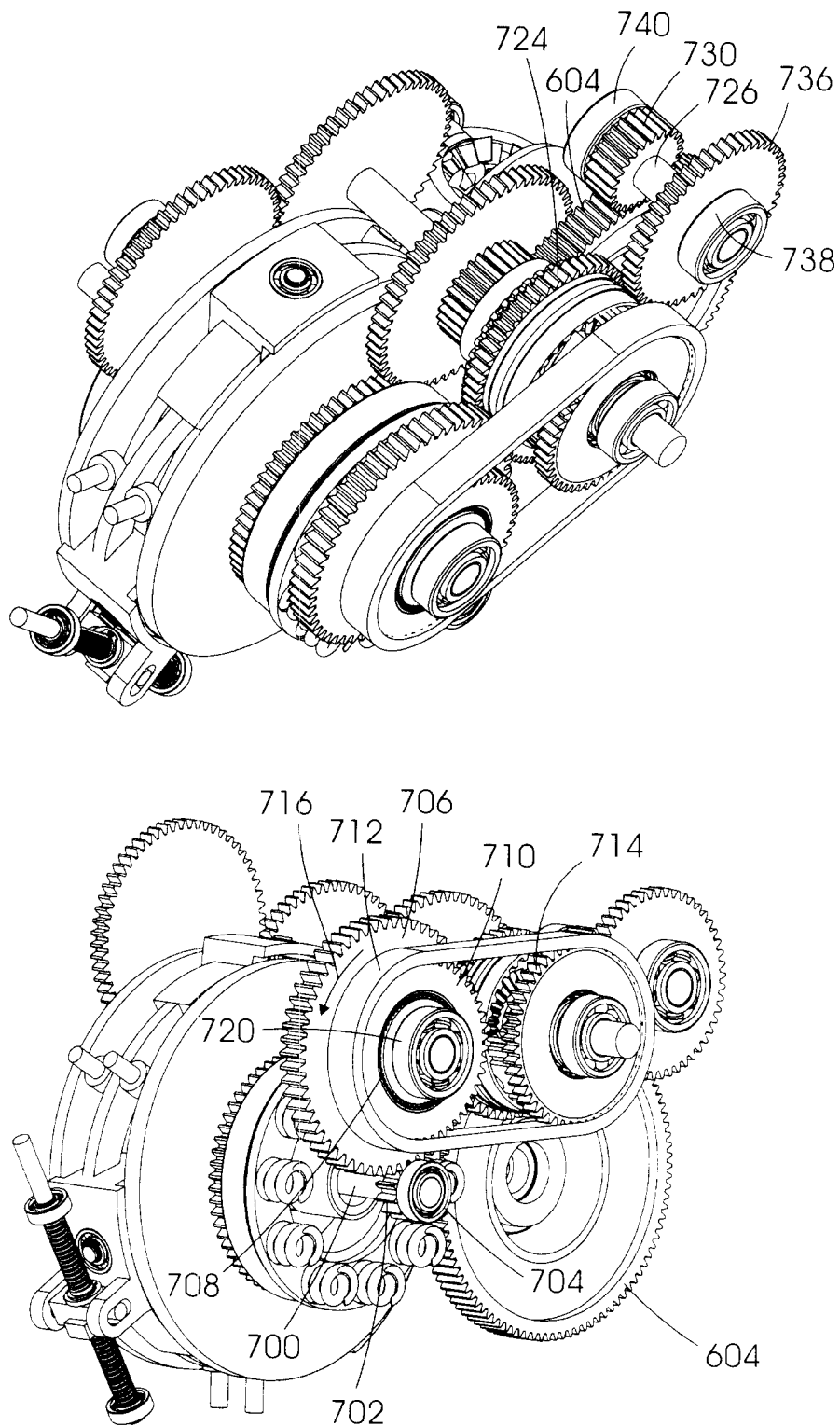
FIGS. 18A and 18B are different perspective views of an embodiment of the variator which addresses a problem of low torque availability at a low variator speed.

The preceding explanation is based on the assumption that the input shaft 28 rotates in the same direction as an engine to which the CVT is attached, i.e. clockwise in FIG. 1A and, in FIG. 18, with the spur gear 702 rotating clockwise. In other positions of the drivers 330 the gear 706 turns slower than the gear 710 and the sprag 708 freewheels.

The gear 706 is supported, on one side, by a bearing 720 in a modified rear casing 18 and on an opposing side by a bearing (not shown) in a modified middle casing 16.

In the modified arrangement shown in FIG. 18 the reverse unit 470 is eliminated. The following changes are made to establish a functional reverse gear. The dog sleeve 474 is shortened and is attached to a ring gear 724; an idler shaft 726 includes a gear 730 which meshes with the gear 604; an opposing end of the shaft 726 is attached to a gear 736; and bearings 738 and 740 support the idler shaft 726 in a modified rear casing 18 and in a modified middle casing 16 respectively (not shown).

When the dog sleeve 474 is moved to the right from the position shown in FIG. 18 the ring gear 724 engages with the gear 736 and reverse is established. The forward drive function is not altered.

Alternative Embodiment

Figures 20A, 20B:
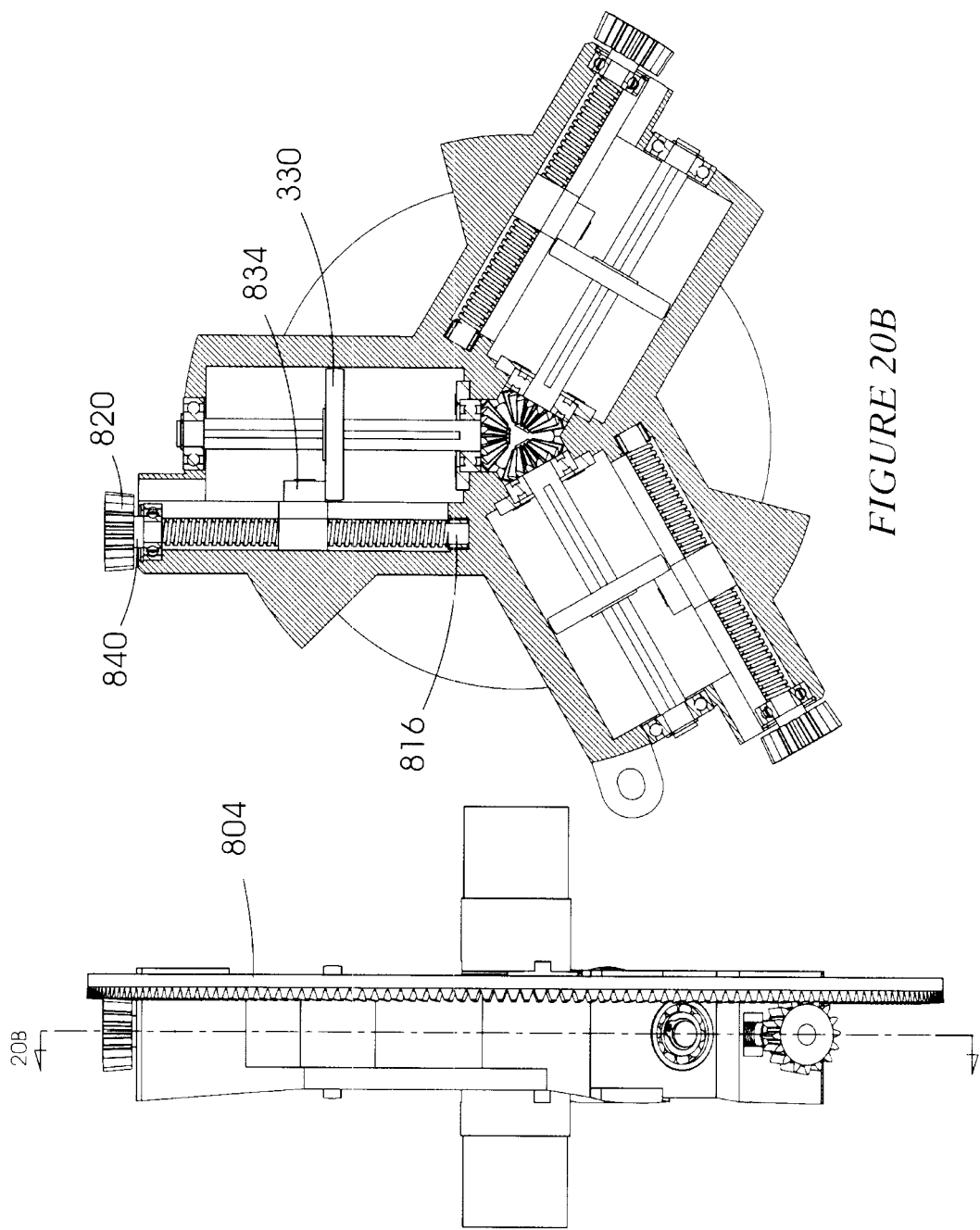
FIG. 20A is another side view of the variator of FIG. 19A.
FIG. 20B is a cross-sectional view of the variator of FIG. 20A, taken on a line 20B-20B in FIG. 20A.

FIGS. 19 and 20 show a variator 800, modified with reference to what is shown in FIGS. 8 to 10, which includes three identical radial positioners 802 and a ring gear 804.

The body 190 has a radial hole 806 with its axis parallel to the axis of each drive shaft 312. A slot 808 connects the rectangular cut out 232 to the hole 806. The hole 806 has a bearing pocket 810 close to the axis 246 of the input shaft 28 and a bearing pocket 812 displaced from the axis 246.

Each radial positioner 802 includes a lead screw thread 814 with a needle bearing 816 on one end and a bearing 818 and a bevel gear 820 on an opposing end.

A lead screw nut 822 has a cylindrical body 826 with a tapped core which mates with the lead screw thread 814. A rectangular body 828 on one side of the body 826 carries a stud 830 to which is mounted a roller 834.

For each positioner the cylindrical body 826 is mounted for sliding movement in a respective radial hole 806 while the rectangular body 828 slides in the adjacent slot 808. The roller 834 is in line contact with a radially outer surface of the driver 330. The needle bearing 816 is located in the bearing pocket 810 and the bearing 818 which is located in the bearing pocket 812 is secured in position by means of a circlip 840.

The ring gear 804, which is rotatably located in a modified middle casing 16, is meshed with the three bevel gears 820 and when the ring gear 804 is rotated the bevel gears 820 are rotated. Each lead screw nut 822 is moved in a radial direction and the rollers 834 reposition the respective drivers 330, also in a radial direction.

The variator 800 is, as before, used with a front disk 184 and a rear disk 186. If each disk has a respective convex surface then the urging together (by means of the pressure ring 122) of the two convex surfaces on the drivers 330 tends to force the drivers radially outwardly away from the axis 246. The radial outer surfaces of the drivers 330 are thus kept in line contact with the rollers 834.

If the front disk 184 and the rear disk 186 have respective concave surfaces then the drivers 330 tend to be forced towards the axis 246. The rollers 834 can then respectively be positioned on opposing sides of the drivers 330.

If the front disk 184 and the rear disk 186 have respective flat surfaces then the lead screw nut 822 is modified to have two of the studs 830, which are radially spaced apart, and two respective rollers 834 are used to support each driver 330 on opposing sides.

In the variator 800 a ratio adjustment is done by rotating the ring gear 804. During this adjustment the variator 800 does not turn relative to the middle casing 16. Thus the axially spaced rollers 72 (FIG. 3) and the ribs 254 (FIGS. 8, 9 and 10) are eliminated. The variator 800 still moves axially as needed but is constrained against rotational movement by external structure (not shown). In this configuration the adjustment device 22 is eliminated.

The respective rim of each driver 330 can have any suitable shape to optimise the friction drive and mechanical efficiency.

If each disk 184, 186 has a concave surface, or a flat surface, or a convex surface, then there is no radius difference, i.e. the contact points 406 and 408 are at the same distance (radius) from the axis 246. The front disk 184 and the rear disk 186 can then be coupled together in a −1 ratio for they rotate at the same speed in different directions. The planetary unit 416 can then be eliminated.

Figures 21A, 21B:
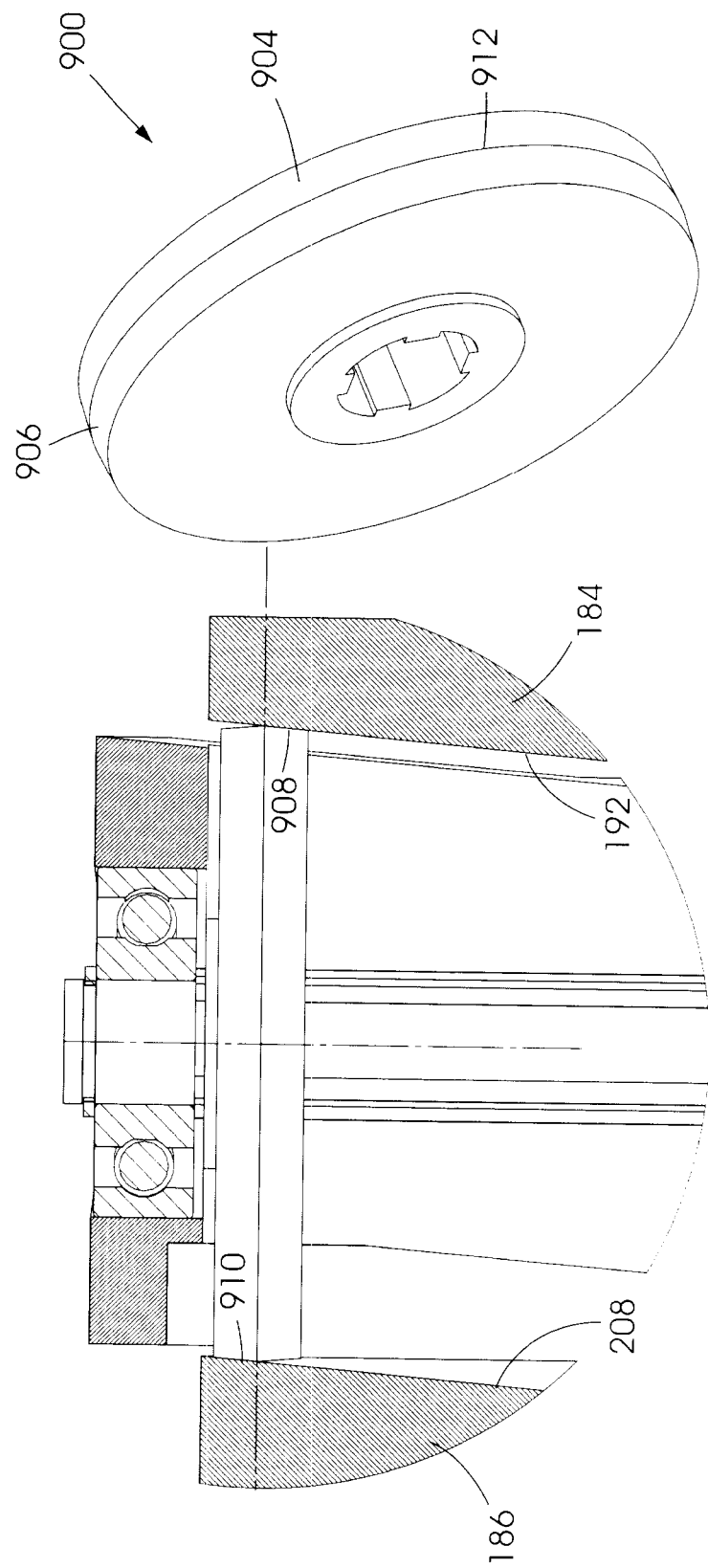
FIG. 21A is a view in section of a modified variator in a low ratio.
FIG. 21B shows a different driver.

FIGS. 21A and 21B illustrate a modified driver 900 which includes a rim 912 with chamfers 904 and 906. The driver 900 is in the same position as the driver 330 in FIG. 11B. The chamfer 904 in use is in line contact 908 with a conical convex front surface 192 of a front disk 184 and the chamfer 906 is in line contact 910 with a conical concave front face 208 of a rear disk 186. The line contact configuration, as opposed to a point contact configuration, reduces contact stresses and allows a more cost-effective material to be used in the drivers and in the disks. The chamfers 904 and 906 may be suitably shaped and have a slight curvature in order to optimise traction fluid friction drive and mechanical efficiency.

Another modification (described with reference to FIG. 18) is to couple an electrical motor, which can serve as a motor or as a generator, to the extension shaft 700 to produce a hybrid arrangement. In this configuration the wheels of a vehicle in which the variator is installed, can be driven via the variator in any of the following modes:

engine only (engine clutch engaged and electric motor off);
engine and motor (engine clutch engaged and electric motor on); and
motor only (engine clutch disengaged and electric motor on).

The wheels could drive the motor, which then acts as a generator, when the vehicle decelerates and the engine clutch is disengaged. The engine can also drive the motor (acting as a generator) to charge batteries in the vehicle. In this configuration the dog sleeve 474 is in a neutral position and the engine clutch is engaged.

If the electric motor is coupled to the cage 480 by a clutch system the engine can charge the batteries via the variator with the engine clutch engaged, and with the electric motor disconnected from the extension shaft 700.

The invention claimed is:

1. A CVT variator operating in a traction fluid which includes:
    a first disk which is rotatable about a first axis in a first direction and which has a first disk face;
    a second disk, spaced apart from the first disk which is rotatable about the first axis in a second direction which is opposite to the first direction and which has a second disk face opposing the first face;
    a drive device which includes a driver with a circular rim and with a central axis, wherein the driver is mounted at a radial distance from the first axis between the first disk face and the second disk face for rotation about the central axis at a first rotational speed;
    a clamping mechanism for urging the disks towards each other so that the circular rim of the driver is frictionally engaged at a contact location with the first disk face and at a second contact location with the second disk face such that a surface of the first disk face at the first contact location is not parallel to the central axis and a surface of the second disk face at the second contact location is not parallel to the central axis; whereby, upon rotation of the driver at the first rotational speed, the first disk and the second disk are respectively rotated and produce respective first and second rotational output drives;
    an actuator for varying said radial distance; and
    a coupling system which couples together the first and second output drives to produce a combined output drive at a second rotational speed.

2. The CVT variator according to claim 1, wherein the coupling system includes a planetary speed balancing system to compensate for rotational speed differences in the first and second rotational output drives.

3. The CVT variator according to claim 1, wherein the ratio of the first rotational speed to the second rotational speed is dependent on the radial distance.

4. The CVT variator according to claim 1, wherein the drive device includes a shaft to which the driver is mounted and wherein the driver is movable along at least a part of a length of the shaft in order to vary said radial distance.

5. The CVT variator according to claim 1, wherein the central axis is at an angle other than 90° to the first axis.

6. The CVT variator according to claim 1, wherein the first disk face is convex and the second disk face is concave.

7. The CVT variator according to claim 1, wherein the first disk face is planar and the second disk face is planar.

8. The CVT variator according to claim 1, which includes a plurality of said drive devices, equally angularly spaced apart from one another circumferentially around the first axis.

9. The CVT variator according to claim 1 in combination with a gear mechanism which transmits along a power path between an input and output and wherein the gear mechanism includes a sprag in the power path, the input to the power path constituting, as well, an output for the combined output drive, whereby the power path is in parallel to a power flow path through the variator, and wherein the sprag is operative to transfer power along the power path from the input to the output when the ration of the first rotational speed and the sprag is inoperative so as not to transfer power from the input to the output when the variator is at a ratio other than said minimum ratio.

10. The CVT variator according to claim 1, wherein the circular rim of the driver has a first surface which is at an angle less than 90° to the central axis and which is in contact with the first disk face at a first contact point formed by the first contact location, and a second surface which is at an angle of less than 90° to the central axis and which is in contact with a second disk surface at the second contact point formed by the second contact location.

11. The CVT variator according to claim 1, wherein the circular rim of the driver has a first surface which is at an angle less than 90° to the central axis and which is in contact with the first disk face at a first contact line formed by the first contact location and a second surface which is at an angle of less than 90° to the central axis and which is in contact with the second disk surface at a second contact line formed by the second contact location.

* * * * *